(12) United States Patent
Kitao

(10) Patent No.: US 12,516,642 B2
(45) Date of Patent: Jan. 6, 2026

(54) CONTROLLER FOR INTERNAL COMBUSTION ENGINE

(71) Applicant: Mitsubishi Electric Corporation, Tokyo (JP)

(72) Inventor: Takeshi Kitao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/850,368

(22) PCT Filed: Jun. 24, 2022

(86) PCT No.: PCT/JP2022/025316
§ 371 (c)(1),
(2) Date: Sep. 24, 2024

(87) PCT Pub. No.: WO2023/199532
PCT Pub. Date: Oct. 19, 2023

(65) Prior Publication Data
US 2025/0207540 A1    Jun. 26, 2025

(30) Foreign Application Priority Data
Apr. 15, 2022 (JP) ................ 2022-067497

(51) Int. Cl.
F02D 41/00    (2006.01)
(52) U.S. Cl.
CPC ....... *F02D 41/009* (2013.01); *F02D 41/0097* (2013.01); *F02D 2200/0406* (2013.01); *F02D 2200/1002* (2013.01)

(58) Field of Classification Search
CPC ............ F02D 41/009; F02D 41/0097; F02D 2200/0406; F02D 2200/1002
See application file for complete search history.

(56) References Cited

U.S. PATENT DOCUMENTS 9,903,290 B2 *  2/2018  Hagari ................. G01M 15/06
2009/0282903 A1  11/2009  Nagano et al.

FOREIGN PATENT DOCUMENTS

JP    2009-275618 A    11/2009
JP    2013-87724 A     5/2013

* cited by examiner

*Primary Examiner* — Kevin A Lathers
(74) *Attorney, Agent, or Firm* — Sughrue Mion, PLLC

(57) ABSTRACT

To provide a controller for an internal combustion engine which can correct the detection error of the crank angle with good accuracy. A controller for an internal combustion engine corrects an angle interval or a time interval of an angle section by a correction value; estimates a shaft torque of a crankshaft using the physical model equation of a crank mechanism based on a detection value of a gas pressure in an intake pipe and a detected angle; calculates an ideal interval angular speed based on an estimation value of the shaft torque; and changes the correction value so that the detection section angular speed after correction approaches the ideal interval angular speed.

12 Claims, 14 Drawing Sheets

| ANGLE IDENTIFICATION NUMBER n | 1 | 2 | ... | n-1 | n | n+1 | ... | 60 |
|---|---|---|---|---|---|---|---|---|
| CORRECTION VALUE Kc | Kc(1) | Kc(2) | ... | Kc(n-1) | Kc(n) | Kc(n+1) | ... | Kc(60) |

CONTROLLER FOR INTERNAL COMBUSTION ENGINE

CROSS-REFERENCE TO RELATED APPLICATIONS

This is a National Stage of International Application No. PCT/JP2022/025316 filed Jun. 24, 2022, claiming priority based on Japanese Patent Application No. 2022-067497 filed Apr. 15, 2022, the entire disclosures of which are incorporated by reference herein.

TECHNICAL FIELD

The present disclosure relates to a controller for an internal combustion engine.

BACKGROUND ART

With regard to the above controller, the technologies described in patent document 1 and patent document 2 are already known. The technology of patent document 1 is configured to calculate a crank angle speed and a crank angle acceleration based on an output signal of a crank angle sensor, calculate a gas pressure torque generated by combustion based on the crank angle speed and the crank angle acceleration, and calculate a work amount by the gas pressure torque.

The technology of patent document 2 is configured to detect the momentary rotational speed of the crankshaft based on the output signal of the crank angle sensor, calculate a measurement parameter based on the momentary rotational speed, acquire an ideal parameter corresponding to an average speed of the momentary rotational speed from a storage means, and learn an error of the measurement parameter with respect to the ideal parameter.

CITATION LIST

Patent Literature

Patent document 1: JP 2009-275618 A
Patent document 2: JP 2013-87724 A

SUMMARY OF INVENTION

Technical Problem

By the way, if the detected part has a manufacture error, a detection error occurs in the crank angle speed and the crank angle acceleration. However, patent document 1 does not disclose a specific method how to deal with this detection error. Accordingly, in the technology of patent document 1, the accuracy of the control performed based on the crank angle speed and the crank angle acceleration may be deteriorated.

In the technology of patent document 2, since the ideal parameter is considered to change according to the operation condition and the external load, erroneous learning may occur in the learning on the basis of the ideal parameter.

Then, the purpose of the present disclosure is to provide a controller for an internal combustion engine which can correct the detection error of the crank angle with good accuracy.

Solution to Problem

A controller for an internal combustion engine which controls an internal combustion engine which is provided with a plurality of detected parts provided at a plurality of preliminarily set crank angles on a rotation member integrally rotating with a crankshaft, a specific crank angle sensor fixed to a nonrotation member and detecting the detected part, and a gas pressure sensor detecting a gas pressure in an intake pipe, the controller for the internal combustion engine including:

an angle information detection unit that detects a crank angle and detects a detection time when the crank angle is detected, based on an output signal of the specific crank angle sensor, calculates an angle interval corresponding to an angle section between detected angles, based on the detected angle which is the detected crank angle, and calculates a time interval corresponding to the angle section, based on the detection time;

an angle information correction unit that corrects the angle interval or the time interval of the each angle section by a correction value provided one corresponding to the each angle section;

an intake pipe gas pressure detection unit that detects the gas pressure in the intake pipe, based on the output signal of the gas pressure sensor;

a shaft torque estimation unit that estimates a shaft torque of a crankshaft generated by a gas pressure in a cylinder and a reciprocating movement of a piston, using a physical model equation of a crank mechanism, based on a detection value of the gas pressure in the intake pipe and the detected angle, for the each angle section;

an ideal angular speed calculation unit that calculates an ideal interval angular speed which is an angular speed corresponding to the each angle section in an ideal state assuming that there is no variation in the plurality of crank angles where the plurality of detected parts are arranged, based on an estimation value of the shaft torque for the each angle section, and the inertia moment of a crankshaft system; and a correction value change unit that changes the correction value for the each angle section so that a detection section angular speed which is an angular speed corresponding to the angle section calculated by the time interval and the angle interval after a correction processing by the correction value approaches the ideal interval angular speed, for the each angle section.

Advantage of Invention

According to the controller for the internal combustion engine of the present disclosure, since the estimation value of the shaft torque is calculated using the physical model equation of the crank mechanism, it is a shaft torque in the ideal state assuming that there is no variation in the arrangement crank angle of the detected parts. Then, since the ideal interval angular speed is calculated based on the estimation value of the shaft torque, it is an interval angular speed in the ideal state. Accordingly, by changing the correction value of the each angle section so that the detection section angular speed approaches the ideal interval angular speed, the correction value can be appropriately changed so as to cancel the variation of the arrangement crank angle of the detected parts, and the detection error of the crank angle can be corrected with good accuracy.

DETAILED DESCRIPTION OF THE EMBODIMENTS

1. Embodiment 1

Figure 1:
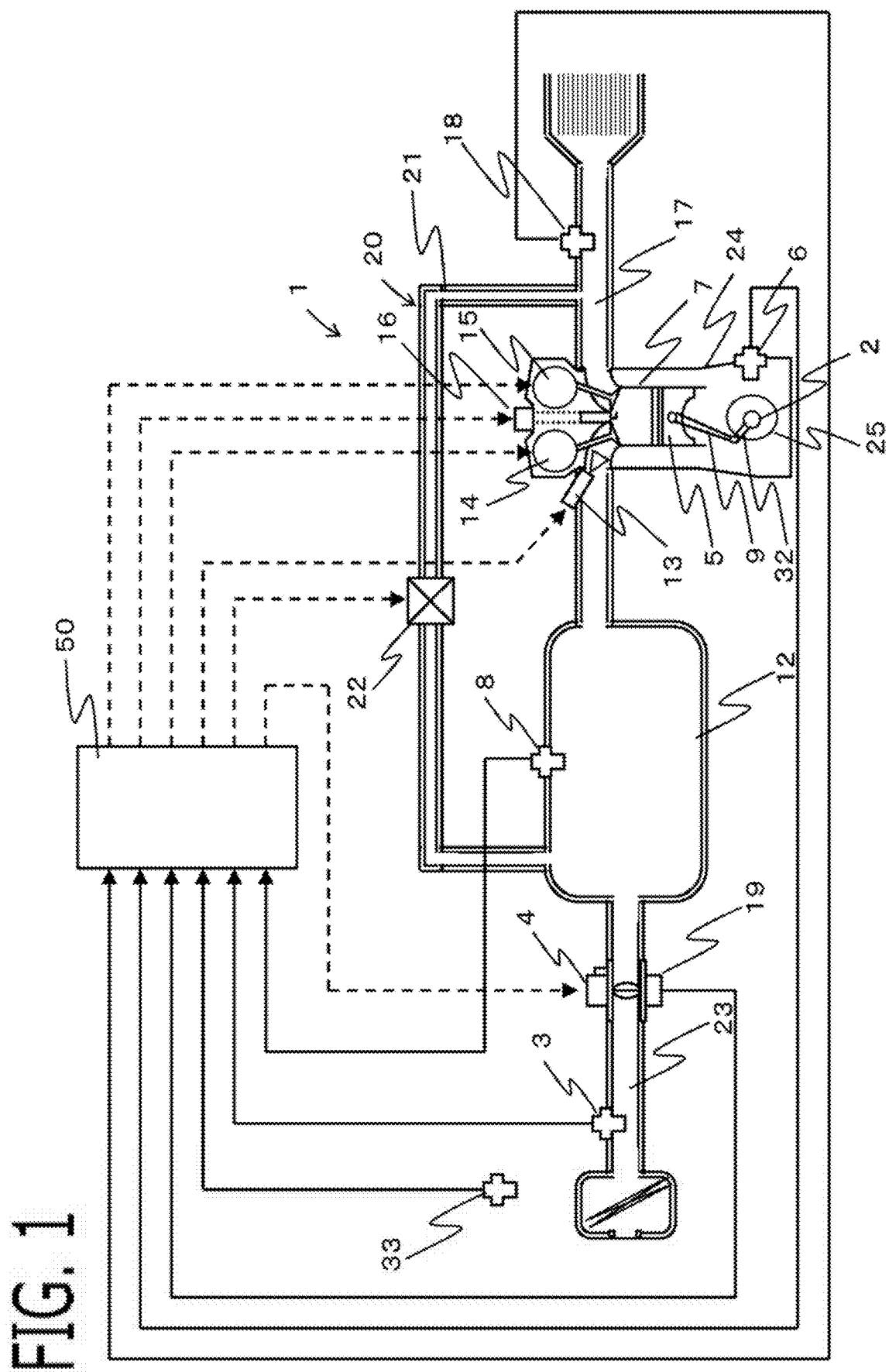
FIG. 1 is a schematic configuration diagram of an internal combustion engine and a controller according to Embodiment 1.
Figure 2:
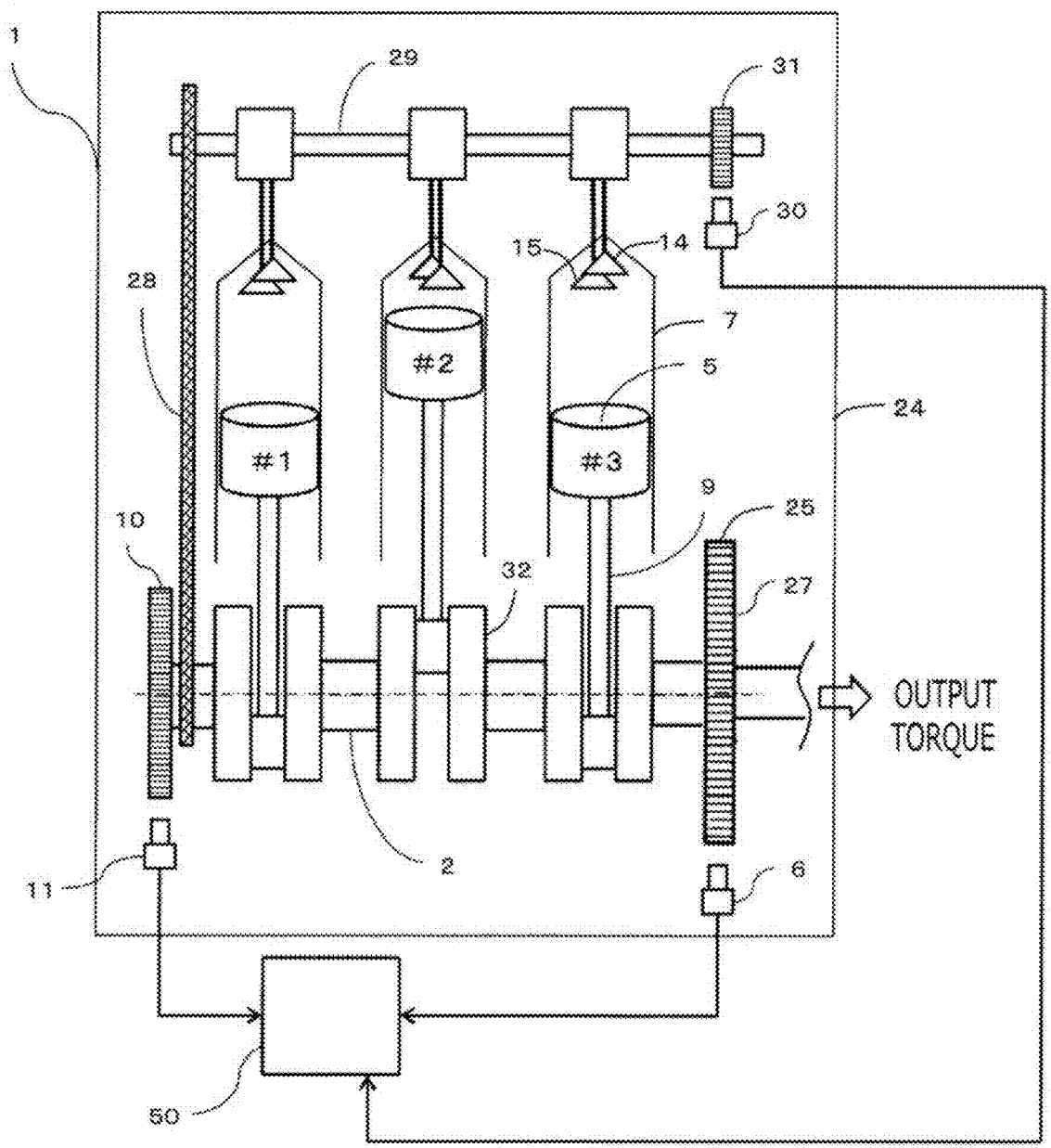
FIG. 2 is a schematic configuration diagram of an internal combustion engine and a controller according to Embodiment 1.
Figure 3:
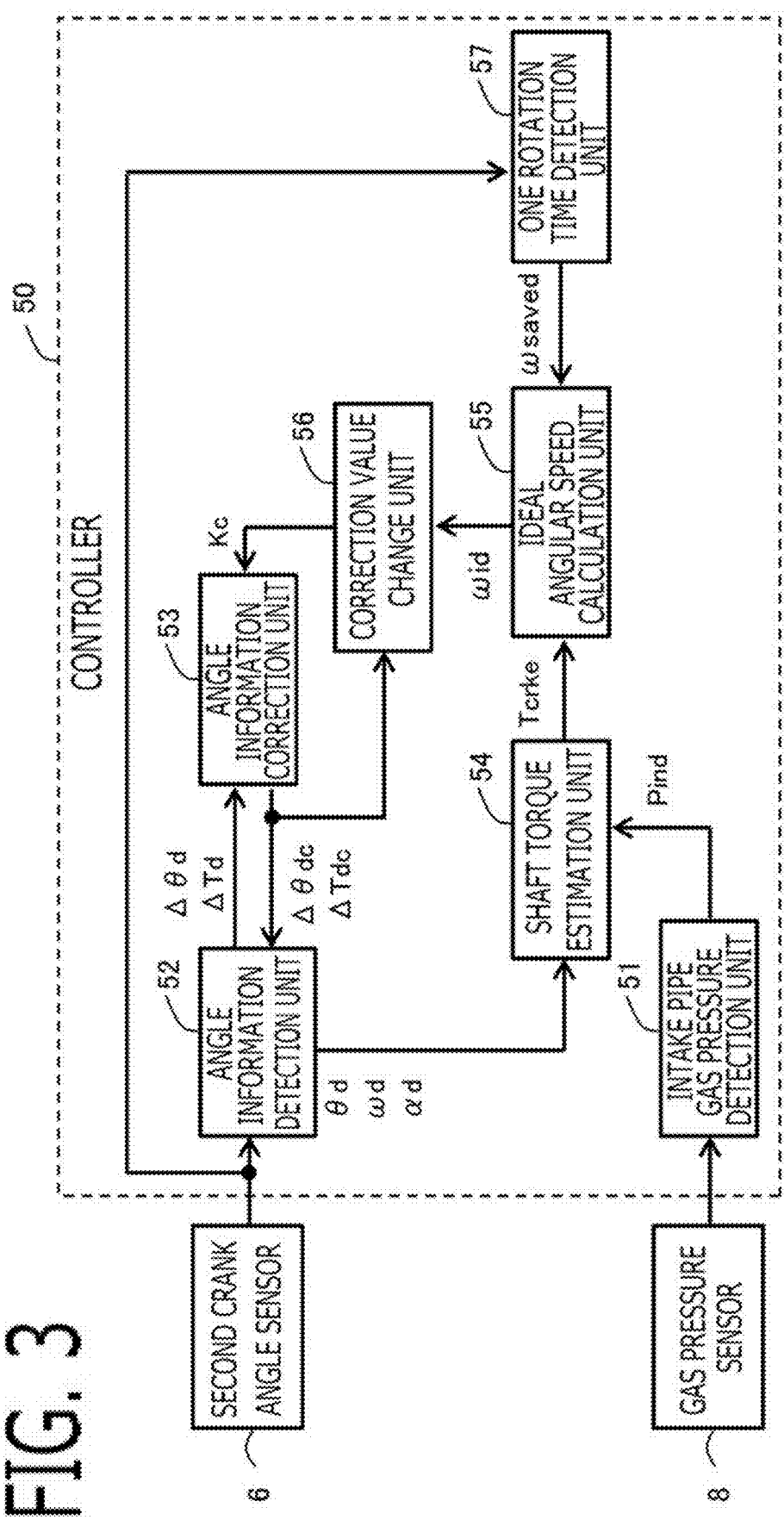
FIG. 3 is a block diagram of the controller according to Embodiment 1.

A controller 50 for an internal combustion engine 1 (hereinafter, referred to simply as the controller 50) according to Embodiment 1 will be explained with reference to the drawings. FIG. 1 and FIG. 2 are a schematic configuration diagram of the internal combustion engine 1 and the controller 50; FIG. 3 is a block diagram of the controller 50 according to Embodiment 1. The internal combustion engine 1 and the controller 50 are mounted in a vehicle; the internal combustion engine 1 functions as a driving-force source for the vehicle (wheels).

1-1. Configuration of Internal Combustion Engine 1

The configuration of the internal combustion engine 1 will be explained. As shown in FIG. 1, the internal combustion engine 1 is provided with cylinders 7 in which a fuel-air mixture is combusted. The internal combustion engine 1 is provided with an intake pipe 23 for supplying air to the cylinders 7 and an exhaust pipe 17 for discharging exhaust gas from the cylinders 7. The internal combustion engine 1 is a gasoline engine. The internal combustion engine 1 is provided with a throttle valve 4 which opens and closes the intake pipe 23. The throttle valve 4 is an electronically controlled throttle valve which is opening/closing-driven by an electric motor controlled by the controller 50. A throttle position sensor 19 which outputs an electric signal according to the opening degree of the throttle valve 4 is provided in the throttle valve 4.

An air flow sensor 3 which outputs an electric signal according to an intake air amount taken into the intake pipe 23 is provided in the intake pipe 23 on the upstream side of throttle valve 4. The internal combustion engine 1 is provided with an exhaust gas recirculation apparatus 20. The exhaust gas recirculation apparatus 20 is provided with an EGR passage 21 which recirculates the exhaust gas from the exhaust pipe 17 to the intake manifold 12, and an EGR valve 22 which opens and closes the EGR passage 21. The intake manifold 12 is a part of the intake pipe 23 on the downstream side of the throttle valve 4. The EGR valve 22 is an electronic controlled EGR valve which is opening/closing-driven by an electric motor controlled by controller 50. An air-fuel ratio sensor 18 which outputs an electric signal according to an air-fuel ratio of exhaust gas in the exhaust pipe 17 is provided in the exhaust pipe 17.

A gas pressure sensor 8 which outputs an electric signal according to a pressure in the intake manifold 12 is provided in the intake manifold 12. An injector 13 for injecting a fuel is provided on the downstream side part of the intake manifold 12. The injector 13 may be provided so as to inject a fuel directly into the cylinder 7. An atmospheric pressure sensor 33 which outputs an electric signal according to an atmospheric pressure is provided in the internal combustion engine 1.

An ignition plug for igniting a fuel-air mixture and an ignition coil 16 for supplying ignition energy to the ignition plug are provided on the top of the cylinder 7. An intake valve 14 for adjusting the amount of intake air to be taken from the intake pipe 23 into the cylinder 7 and an exhaust valve 15 for adjusting the amount of exhaust gas to be exhausted from the cylinder to the exhaust pipe 17 are provided on the top of the cylinder 7. The intake valve 14 is provided with an intake variable valve timing mechanism for varying the opening and closing timing thereof. The exhaust valve 15 is provided with an exhaust variable valve timing mechanism for varying the opening and closing timing thereof. Each of the variable valve timing mechanisms 14, 15 is provided with an electric actuator.

As shown in FIG. 2, the internal combustion engine 1 is provided with a plurality of cylinders 7 (in this example, three). A piston 5 is provided inside of the each cylinder 7. The piston 5 of each cylinder 7 is connected to a crankshaft 2 via a connecting rod 9 and a crank 32. The crankshaft 2 is rotated by reciprocating movement of the piston 5. A combustion gas pressure generated in each cylinder 7 presses the top face of the piston 5, and rotates the crankshaft 2 via the connecting rod 9 and the crank 32. The crankshaft 2 is connected with a power transfer mechanism which transmits driving force to the wheels. The power transfer mechanism is provided with a gearbox, a differential gear, and the like. The vehicle provided with the internal combustion engine 1 may be a hybrid vehicle provided with a motor generator in the power transfer mechanism.

The internal combustion engine 1 is provided with a signal plate 10 which rotates integrally with the crankshaft 2. A plurality of teeth are provided in the signal plate 10 at a plurality of preliminarily set crank angles. In the present embodiment, the teeth of the signal plate 10 are arranged at intervals of 10 degrees. The teeth of the signal plate 10 are provided with a chipped tooth part in which a part of teeth is chipped. The internal combustion engine 1 is provided with a first crank angle sensor 11 which is fixed to an engine block 24 and detects the tooth of the signal plate 10.

The internal combustion engine 1 is provided with a cam shaft 29 connected with crankshaft 2 via a chain 28. The cam shaft 29 opens and closes the intake valve 14 and the exhaust valve 15. During the crankshaft 2 rotates twice, the cam shaft 29 rotates once. The internal combustion engine 1 is provided with a signal plate 31 for cam which rotates integrally with the cam shaft 29. A plurality of teeth are provided in the signal plate 31 for cam at a plurality of preliminarily set cam shaft angles. The internal combustion engine 1 is provided with a cam angle sensor 30 which is fixed to the engine block 24 and detects the tooth of signal plate 31 for cam.

Based on two kinds of output signals of the first crank angle sensor 11 and the cam angle sensor 30, the controller 50 detects the crank angle on the basis of the top dead center of each piston 5 and determines the stroke of each cylinder 7. The internal combustion engine 1 is a 4-stroke engine which has an intake stroke, a compression stroke, a combustion stroke, and an exhaust stroke.

The internal combustion engine 1 is provided with a flywheel 27 which rotates integrally with the crankshaft 2. The peripheral part of flywheel 27 is a ring gear 25, and a plurality of teeth are provided in the ring gear 25 at a plurality of preliminarily set crank angles. The teeth of the ring gear 25 are arranged in the peripheral direction with equiangular intervals. In this example, 60 teeth are provided at intervals of 6 degrees. The teeth of ring gear 25 are not provided with a chipped tooth part. The internal combustion engine 1 is provided with a second crank angle sensor 6 which is fixed to the engine block 24 and detects the tooth of the ring gear 25. The second crank angle sensor 6 is disposed oppositely to the ring gear 25 with a space in radial-direction outside of the ring gear 25. The side of the flywheel 27 opposite to the crankshaft 2 is connected with a power transfer mechanism. Accordingly, the output torque of the internal combustion engine 1 passes through a part of the flywheel 27, and is transmitted to the wheels side.

Each of the first crank angle sensor 11, the cam angle sensor 30, and the second crank angle sensor 6 outputs an electric signal according to a change in the distance between each sensor and tooth by the rotation of the crankshaft 2. The output signal of each angle sensor 11, 30, 6 becomes a rectangular wave in which a signal turns on or off when the distance between sensor and tooth is close or when the distance is far. An electromagnetic pickup type sensor is used for each angle sensor 11, 30, 6, for example.

Since the flywheel 27 (the ring gear 25) has a larger number of teeth than the number of teeth of the signal plate 10, and there is also no chipped tooth part, a high resolution angle detection can be expected. Since the flywheel 27 has a mass larger than the mass of the signal plate 10 and high frequency vibration is suppressed, a high accuracy of angle detection can be expected.

In the present embodiment, the second crank angle sensor 6 corresponds to "a specific crank angle sensor" in the present disclosure, the flywheel 27 corresponds to "a rotation member" in the present disclosure, the tooth of ring gear 25 provided in flywheel 27 corresponds to "a detected part" in the present disclosure, and the engine block 24 corresponds to "a nonrotation member" in the present disclosure.

1-2. Configuration of Controller 50

Figure 4:
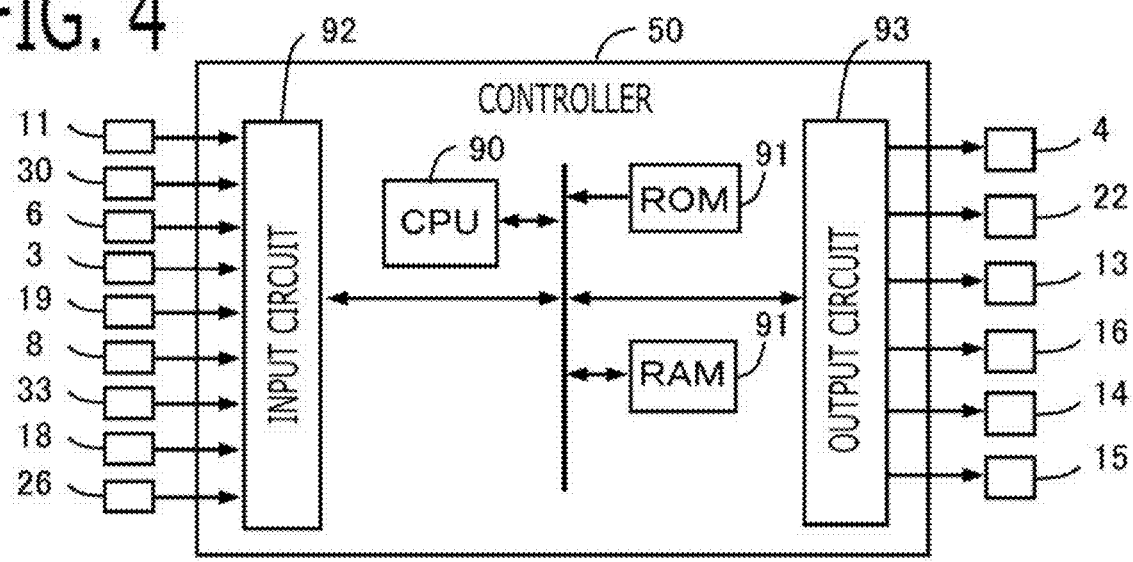
FIG. 4 is a hardware configuration diagram of the controller according to Embodiment 1.

Next, the controller 50 will be explained. The controller 50 is a controller for controlling the internal combustion engine 1. As shown in FIG. 3, the controller 50 is provided with control units, such as an intake pipe gas pressure detection unit 51, an angle information detection unit 52, an angle information correction unit 53, a shaft torque estimation unit 54, an ideal angular speed calculation unit 55, a correction value change unit 56, and one rotation time detection unit 57. The respective control units 51 to 57 of the controller 50 are realized by processing circuits provided in the controller 50. Specifically, as shown in FIG. 4, the controller 50 is provided with, as a processing circuit, an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed.

As the storage apparatus 91, volatile and nonvolatile storage apparatuses, such as RAM (Random Access Memory), ROM (Read Only Memory), and EEPROM (Electrically Erasable Programmable ROM), are provided. The input circuit 92 is connected with various kinds of sensors and switches and is provided with an A/D converter and the like for inputting output signals from the sensors and the switches to the arithmetic processor 90. The output circuit 93 is connected with electric loads and is provided with a driving circuit and the like for outputting a control signal from the arithmetic processor 90.

Then, the arithmetic processor 90 runs software items (programs) stored in the storage apparatus 91 such as a ROM and collaborates with other hardware devices in the controller 50, such as the storage apparatus 91, the input circuit 92, and the output circuit 93, so that the respective functions of the control units 51 to 57 provided in the controller 50 are realized. Setting data, such as the inertia moment Icrk and the determination value, used by the control units 51 to 57 are stored in the storage apparatus 91, such as ROM and EEPROM. Data, such as a correction value Kc, an angle interval $\Delta\theta d$, a time interval $\Delta Td$, each computed value, and each detection value, calculated by the control units 51 to 57 are stored in the rewritable storage apparatus 91 such as a RAM.

In the present embodiment, the input circuit 92 is connected with the first crank angle sensor 11, the cam angle sensor 30, the second crank angle sensor 6, the air flow sensor 3, the throttle position sensor 19, the gas pressure sensor 8, the atmospheric pressure sensor 33, the air fuel ratio sensor 18, an accelerator position sensor 26, and the like. The output circuit 93 is connected with the throttle valve 4 (electric motor), the EGR valve 22 (electric motor), the injector 13, the ignition coil 16, the intake-air variable valve timing mechanism 14, the exhaust-gas variable valve timing mechanism 15, and the like. The controller 50 is connected with various kinds of unillustrated sensors, switches, actuators, and the like. The controller 50 detects operating conditions of the internal combustion engine 1, such as an intake air amount, a pressure in the intake manifold, an atmospheric pressure, an air-fuel ratio, and an accelerator opening degree, based on the output signals of various sensors.

As a basic control, the controller 50 calculates a fuel injection amount, an ignition timing, and the like, based on the inputted output signals and the like from the various kinds of sensors, and then drives and controls the injector 13, the ignition coil 16, and the like. Based on the output signal of the accelerator position sensor 26 and the like, the controller 50 calculates an output torque of the internal combustion engine 1 demanded by the driver, and then controls the throttle valve 4 and the like so that an intake air amount for realizing the demanded output torque is achieved. Specifically, the controller 50 calculates a target throttle opening degree and then drives and controls the electric motor of the throttle valve 4 so that the throttle opening degree which is detected based on the output signal of the throttle position sensor 19 approaches the target throttle opening degree. And, the controller 50 calculates a target opening degree of the EGR valve 22 based on the inputted output signals and the like from the various kinds of sensors and then drives and controls the electric motor of the EGR valve 22. The controller 50 calculates a target opening and closing timing of the intake valve and a target opening and closing timing of the exhaust valve based on the output signals of the various sensors, and drives and controls the intake and the exhaust variable valve timing mechanisms 14, 15 based on each target opening and closing timing.

<Intake Pipe Gas Pressure Detection Unit 51>

The intake pipe gas pressure detection unit 51 detects a gas pressure Pind in the intake pipe based on the output signal of the gas pressure sensor 8. The gas pressure Pind in the intake pipe is detected for every prescribed detection period.

<Angle Information Detection Unit 52>

Figure 5:
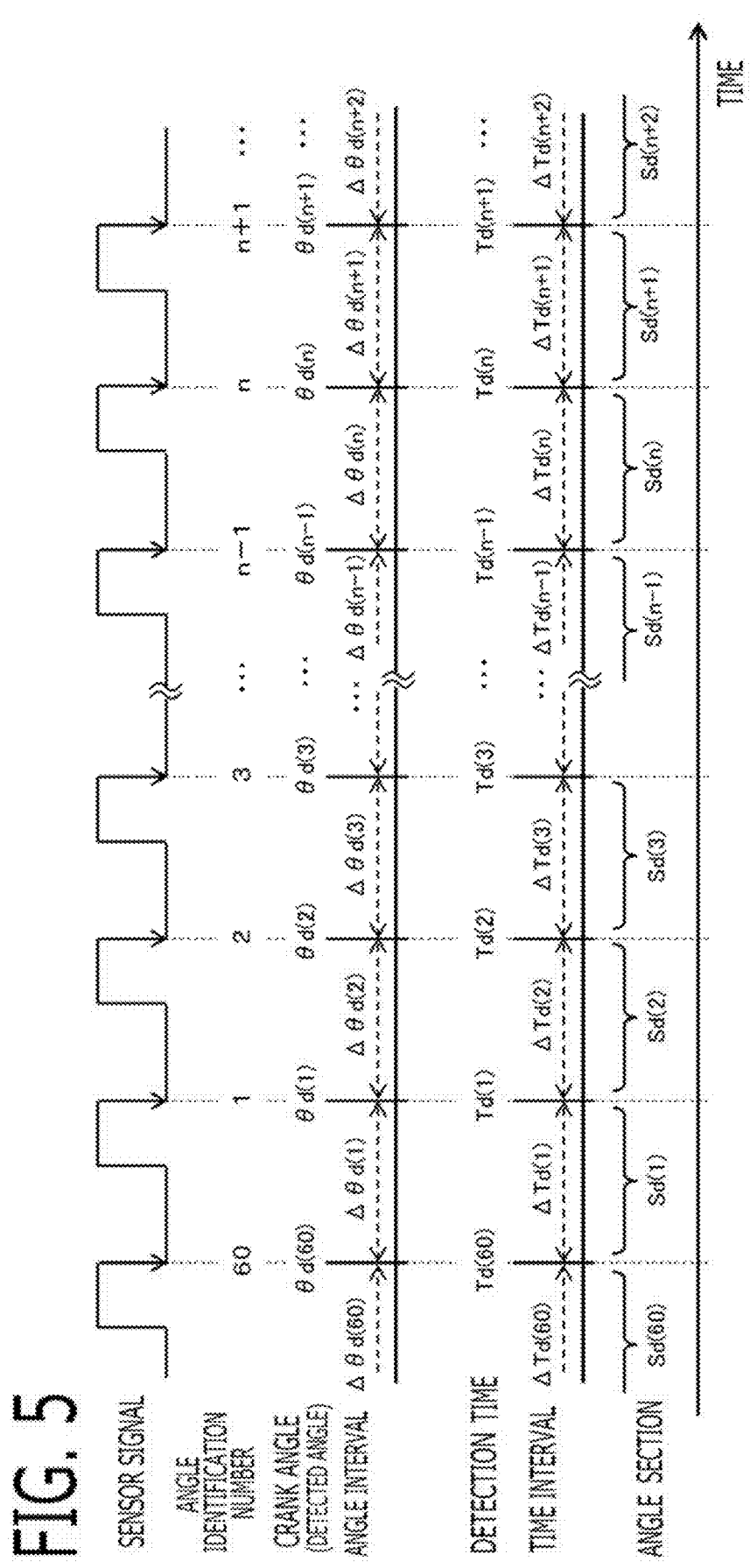
FIG. 5 is a time chart for explaining an angle information detection processing according to Embodiment 1.

As shown in FIG. 5, the angle information detection unit 52 detects a crank angle $\theta d$ based on the output signal of the second crank angle sensor 6 which is the specific crank angle sensor, and detects a detection time Td when the crank angle $\theta d$ is detected. Then, the angle information detection unit 52 calculates an angle interval $\Delta\theta d$ corresponding to an angle section Sd between detected angles $\theta d$, based on the detected angle $\theta d$ which is the detected crank angle, and calculates a time interval $\Delta Td$ corresponding to the angle section Sd based on the detection time Td.

In the present embodiment, the angle information detection unit 52 determines the crank angle $\theta d$ when a falling edge (or rising edge) of the output signal (rectangular wave) of the second crank angle sensor 6 is detected. The angle information detection unit 52 determines a basepoint falling edge which is a falling edge corresponding to a basepoint angle (for example, 0 degree which is a top dead center of the piston 5 of the first cylinder 7), and determines the crank angle $\theta d$ corresponding to a number n of the falling edge which is counted up from the basepoint falling edge (hereinafter, referred to as an angle identification number n). For example, when the basepoint falling edge is detected, the angle information detection unit 52 sets the crank angle $\theta d$ to the basepoint angle (for example, 0 degree), and sets the angle identification number n to 1. Then, every time the falling edge is detected, the angle information detection unit 52 increases the crank angle $\theta d$ by a preliminarily set angle interval $\Delta\theta d$ (in this example, 6 degrees) and increases the angle identification number n by one. Alternatively, the angle information detection unit 52 may read out the crank angle $\theta d$ corresponding to the present identification number n, using an angle table in which a relationship between the angle identification number n and the crank angle $\theta d$ is preliminarily set. The angle information detection unit 52 correlates the crank angle $\theta d$ (the detected angle $\theta d$) with the angle identification number n. The angle identification number n returns to 1 after the maximum number (in this example, 60). The previous angle identification number n of the angle identification number n=1 is 60, and the next angle identification number n of the angle identification number n=60 is 1.

In the present embodiment, the case where a chipped tooth is not provided is explained, but a chipped tooth may be provided. In this case, the detection time Td and the detected angle $\theta d$ in which the chipped tooth part is complemented by the information before and after the chipped tooth part may be used, or the detection time Td and the detected angle $\theta d$ in which the chipped tooth part is not complemented may be used as it is. If the chipped tooth part is not complemented, the angle interval $\Delta\theta d$ corresponding to the chipped tooth part is used in each calculation.

In the present embodiment, as described later, the angle information detection unit 52 determines the basepoint falling edge of the second crank angle sensor 6 by referring to a reference crank angle $\theta r$ detected based on the first crank angle sensor 11 and the cam angle sensor 30. For example, the angle information detection unit 52 determines the falling edge of the second crank angle sensor 6 that the reference crank angle $\theta r$ when the falling edge is detected is the closest to the basepoint angle, as the basepoint falling edge.

The angle information detection unit 52 determines the stroke of each cylinder 7 corresponding to the crank angle $\theta d$ by referring to the stroke of each cylinder 7 determined based on the first crank angle sensor 11 and the cam angle sensor 30.

The angle information detection unit 52 detects the detection time Td when the falling edge of the output signal (rectangular wave) of the second crank angle sensor 6 is detected, and correlates the detection time Td with the angle identification number n. Specifically, the angle information detection unit 52 detects the detection time Td using a timer function provided in the arithmetic processor 90.

As shown in FIG. 5, when the falling edge is detected, the angle information detection unit 52 sets the angle section between the detected angle $\theta d$ (n) corresponding to the present angle identification number (n) and the detected angle $\theta d$ (n−1) corresponding to the previous angle identification number (n−1), as the angle section Sd (n) corresponding to the present angle identification number (n).

As shown in the equation (1), when the falling edge is detected, the angle information detection unit 52 calculates a deviation between the detected angle $\theta d$ (n) corresponding to the present angle identification number (n) and the detected angle $\theta d$ (n−1) corresponding to the previous angle identification number (n−1), and sets the calculated deviation as the angle interval $\Delta\theta d$ (n) corresponding to the present angle identification number (n) (the present angle section Sd (n)).

[Math. 1]

$$\Delta\theta d(n) = \theta d(n) - \theta d(n-1) \qquad (1)$$

In the present embodiment, since all the angle intervals of the tooth of ring gear 25 are made equal, the angle information detection unit 52 sets the angle interval $\Delta\theta d$ of all the angle identification numbers n as a preliminarily set angle (in this example, 6 degrees).

As shown in the equation (2), when the falling edge is detected, the angle information detection unit 52 calculates a deviation between the detection time Td (n) corresponding to the present angle identification number (n) and the detection time Td (n−1) corresponding to the previous angle identification number (n−1), and sets the calculated deviation as the time interval ΔTd (n) corresponding to the present angle identification number (n) (the present angle section Sd (n)).

[Math. 2]

$$\Delta Td(n) = Td(n) - Td(n-1) \quad (2)$$

Based on two kinds of output signals of the first crank angle sensor 11 and the cam angle sensor 30, the angle information detection unit 52 detects the reference crank angle θr on the basis of the top dead center of the piston 5 of the first cylinder 7, and determines the stroke of each cylinder 7. For example, the angle information detection unit 52 determines the falling edge just after the chipped tooth part of the signal plate 10 based on the time interval of the falling edge of the output signal (rectangular wave) of the first crank angle sensor 11. Then, the angle information detection unit 52 determines a correspondency between the each falling edge on the basis of the falling edge just after the chipped tooth part, and the reference crank angle θr on the basis of the top dead center, and calculates the reference crank angle θr on the basis of the top dead center at the time when the each falling edge is detected. The angle information detection unit 52 determines the stroke of each cylinder 7 based on a relationship between the position of the chipped tooth part in the output signal (rectangular wave) of the first crank angle sensor 11, and the output signal (rectangular wave) of the cam angle sensor 30.

<Angle Information Correction Unit 53>

The angle information correction unit 53 corrects the angle interval Δθd or the time interval ΔTd in the each angle section Sd by a correction value Kc provided one corresponding to the each angle section Sd.

Figures 6, 7:
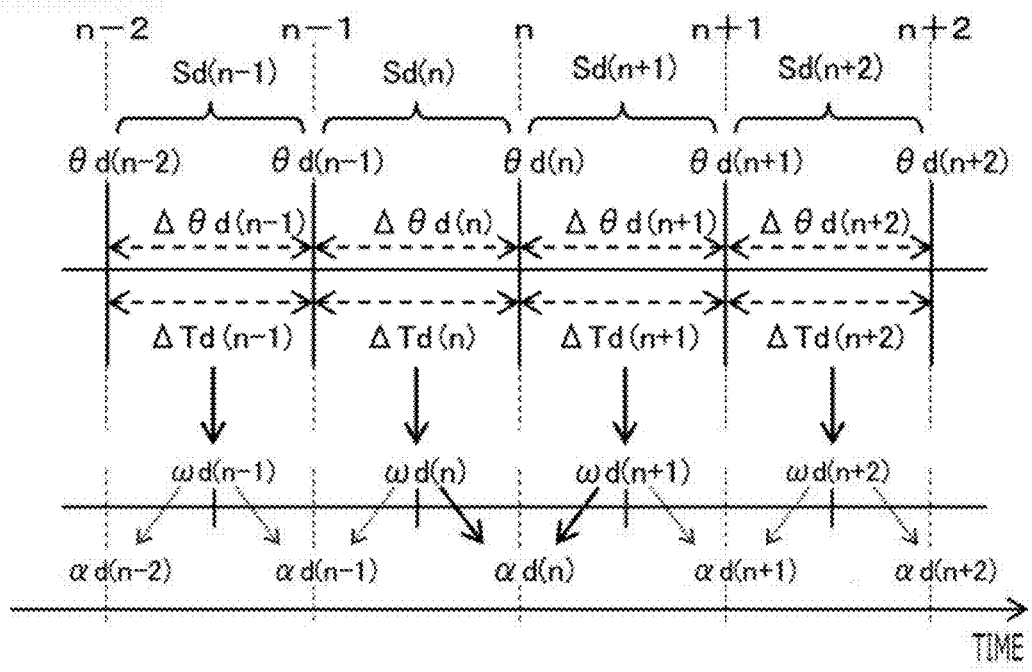
FIG. 6 is a figure for explaining a correction value stored in a storage apparatus according to Embodiment 1.
FIG. 7 is a time chart for explaining the calculation processing of the crank acceleration and the angular acceleration according to Embodiment 1.

In the present embodiment, the angle information correction unit 53 provides one correction value Kc (n) in the angle section Sd (n) of the each angle identification number n. In this example, since the angle identification number n and the angle section Sd are provided 60, the correction value Kc is also provided 60. As shown in FIG. 6, the each correction value Kc is correlated with the each angle identification number n, and is stored in the rewritable storage apparatus 91 such as RAM of the controller 50.

For example, as shown in the equation (3), the angle information correction unit 53 calculates a time interval after correction ΔTdc (n) corresponding to the present angle identification number (n) by multiplying the correction value Kc (n) corresponding to the present angle identification number (n) to the time interval ΔTd (n) corresponding to the present angle identification number (n). Alternatively, the angle information correction unit 53 calculates an angle interval after correction Δθdc (n) corresponding to the present angle identification number (n) by dividing the angle interval Δθd (n) corresponding to the present angle identification number (n) by the correction value Kc (n) corresponding to the present angle identification number (n).

[Math. 3]

$$\Delta Tdc(n) = Td(n) \times Kc(n) \quad (3)$$

or $$\Delta\theta dc(n) = \Delta\theta d(n)/Kc(n)$$

Alternatively, the angle information correction unit 53 may correct the crank angle speed ωd (n) calculated by the angle interval Δθd (n) and the time interval ΔTd (n) before correction with the correction value Kc (n).

In the present embodiment, a case where the time interval ΔTd is corrected by the correction value Kc is explained. The angle interval Δθd which is not corrected by the correction value Kc is also referred to as the angle interval Δθdc after correction processing for convenience of explanation.

<Calculation of Crank Angle Speed ωd and Crank Angle Acceleration αd>

Based on the angle interval Δθdc and the time interval ΔTdc after the correction processing by the correction value Kc, the angle information detection unit 52 calculates a crank angle speed ωd which is a time change rate of the crank angle θd and a crank angular acceleration αd which is a time change rates of the crank angle speed ωd, corresponding to each of the detected angle θd or the angle section Sd.

In the present embodiment, as shown in FIG. 7, the angle information detection unit 52 calculates the crank angle speed ωd (n) corresponding to the angle section Sd (n) which is set as a processing object, based on the angle interval Δθdc (n) and the time interval ΔTdc (n) after the correction processing corresponding to the angle section Sd (n) of the processing object. Specifically, as shown in the equation (4), the angle information detection unit 52 calculates the crank angle speed ωd (n) by dividing the angle interval Δθdc (n) after the correction processing corresponding to the angle section Sd (n) of the processing object by the time interval ΔTdc (n) after the correction processing.

[Math. 4]

$$\omega d(n) = \frac{\Delta\theta dc(n)}{\Delta Tdc(n)} \times \frac{\pi}{180} \quad (4)$$

Based on the crank angle speed ωd (n) and the time interval ΔTdc (n) after the correction processing, corresponding to one angle section Sd (n) just before the detected angle θd (n) which is set as the processing object, and the crank angle speed ωd (n+1) and the time interval ΔTdc (n+1) after the correction processing, corresponding to one angle section Sd (n+1) just after the detected angle θd (n) of the processing object, the angle information calculation unit 53 calculates the crank angle acceleration αd (n) corresponding to the detected angle θd (n) of the processing object. Specifically, as shown in the equation (5), the angle information detection unit 52 calculates the crank angular acceleration αd (n) by dividing a subtraction value obtained by subtracting the crank angle speed ωd (n) just before from the crank angle speed ωd (n+1) just after by an average value of the time interval ΔTdc (n+1) after the correction processing just after, and the time interval ΔTdc (n) after the correction processing just before.

[Math. 5]

$$\alpha d(n) = \frac{\omega d(n+1) - \omega d(n)}{\Delta Tdc(n+1) + \Delta Tdc(n)} \times 2 \quad (5)$$

The crank angle speed ωd (n) and the crank angular acceleration αd (n) are used for various well-known internal combustion engine controls, such as the estimation of combustion state.

<Problem Due to Variation of Arrangement Crank Angle of Tooth>

Figure 8:
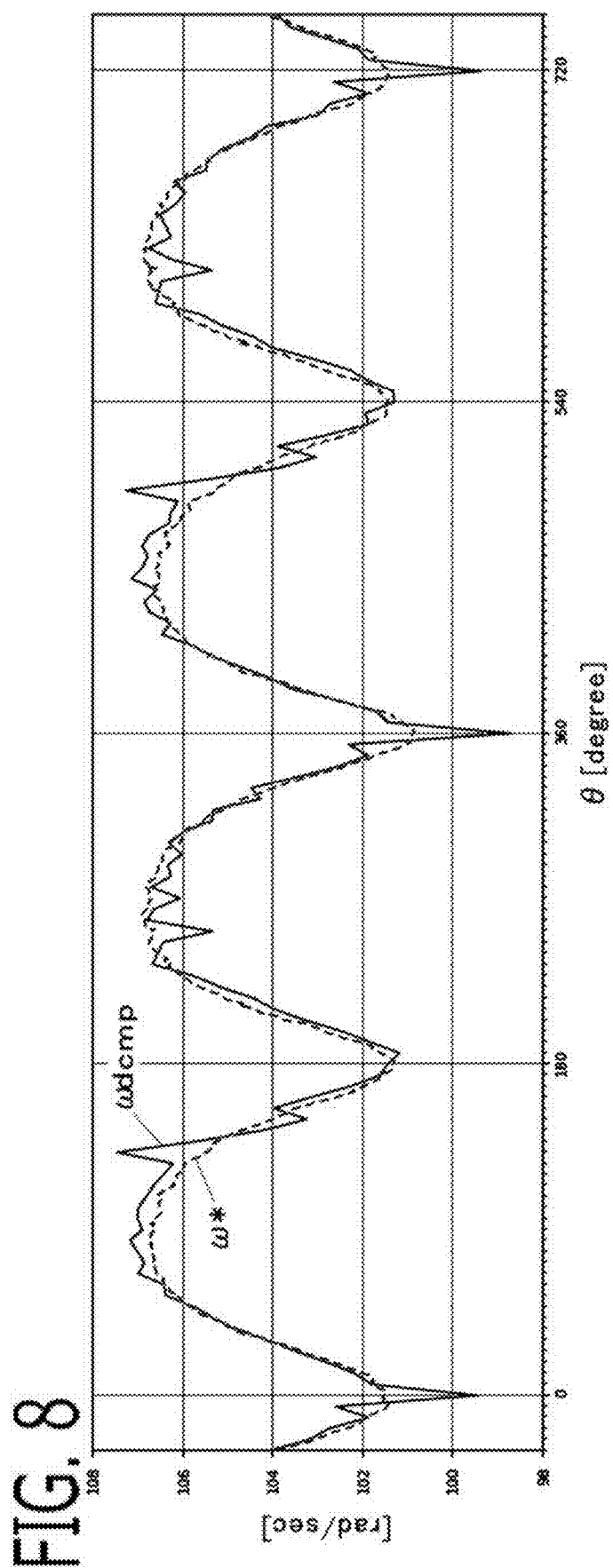
FIG. 8 is a figure for explaining the variation of the crank angle speed when the correction processing is not performed according to Embodiment 1.

Due to the manufacturing error and the aging change of the teeth of the ring gear 25, the crank angle at which each tooth is arranged varies from the prescribed angle of every 6 degrees. FIG. 8 shows the behavior of the crank angle speed ωdcmp without the correction processing calculated based on the angle interval Δθd and the time interval ΔTd which are not corrected by the correction value Kc, and a high precision crank angle speed ω* detected by the high precision rotation sensor provided for measurement, when the variation of the arrangement crank angle of the teeth occurs. As shown in FIG. 8, the crank angle speed ωdcmp without the correction processing varies with respect to the high precision crank angle speed ω* for measurement due to the variation of the arrangement crank angle of each tooth.

Figure 9:
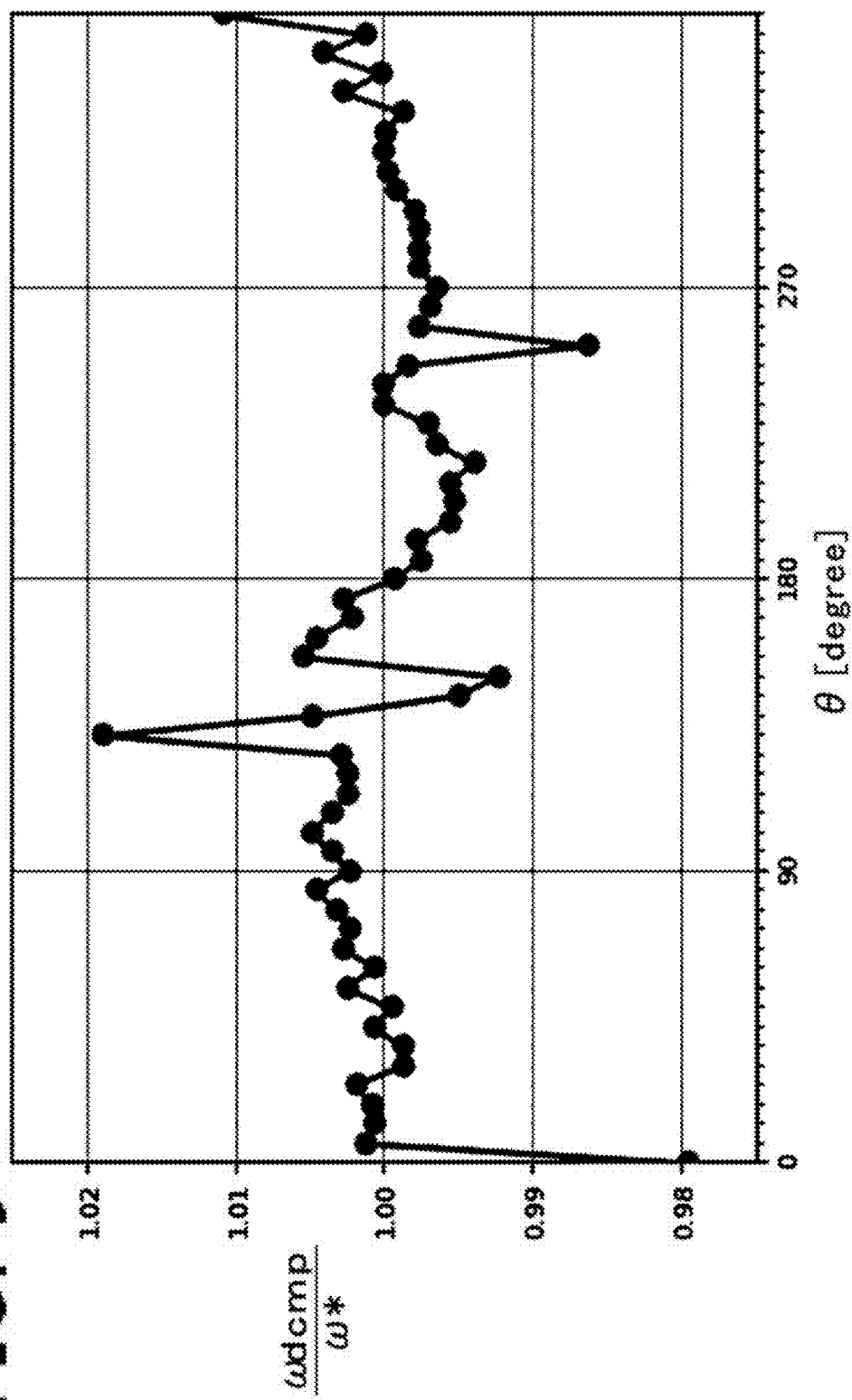
FIG. 9 is a figure for explaining the variation of the crank angle speed when the correction processing is not performed according to Embodiment 1.

FIG. 9 shows an angular speed ratio obtained by dividing the crank angle speed ωdcmp without the correction processing by the high precision crank angle speed ω* for measurement, at each crank angle. When the angular speed ratio is larger than 1, the actual angle interval is shorter than the prescribed angle interval (6 degrees), and when the angular speed ratio is smaller than 1, the actual angle interval is longer than the prescribed angle interval (6 degrees). Accordingly, if the correction value Kc is not appropriately changed so that the variation of the arrangement crank angle of the teeth is canceled, and the correction is not performed by the correction value Kc, a high frequency component is superimposed on the crank angle speed ωd and the crank angular acceleration αd which were calculated, and the control accuracy of the internal combustion engine, such as estimation of the combustion state and the combustion control, is deteriorated. In the following, the processing for changing the correction value Kc appropriately will be explained.

<Shaft Torque Estimation Unit 54>

The shaft torque estimation unit 54 estimates a shaft torque Tcrke (n) of the crankshaft by a gas pressure in cylinder and a reciprocating movement of the piston, using a physical model equation of a crank mechanism, based on the detection value Pind of the gas pressure in the intake pipe and the detected angle θd, for the each angle section Sd (n).

In the present embodiment, as explained in the following, the shaft torque estimation unit 54 calculates a gas pressure torque Tgas generated by the gas pressure in cylinder Pcyl and an inertia torque Tin generated by the reciprocating movement of the piston; and calculates an estimation value of the shaft torque Tcrke by summing the gas pressure torque Tgas and the inertia torque Tin.

The shaft torque estimation unit 54 calculates the gas pressure torque Tgas generated by the gas pressure in cylinder Pcyl, using the physical model equation that calculates the gas pressure torque generated by the gas pressure in cylinder, based on detection value of the gas pressure in the intake pipe Pind.

In the present embodiment, the shaft torque estimation unit 54 calculates the gas pressure torque Tgas generated by the gas pressure in cylinder when assuming that the internal combustion engine is in an unburning state.

As shown in the next equation, for the cylinder i whose intake valve and exhaust valve are closed, the shaft torque estimation unit 54 calculates the gas pressure in cylinder Pcyl_i, using the equation that calculates a gas pressure by a polytrophic change, based on the detection value of the gas pressure in the intake pipe Pind and the crank angle θd. For the cylinder i whose intake valve is opened and whose exhaust valve is closed, the shaft torque estimation unit 54 calculates the gas pressure in cylinder Pcyl_i, based on the detection value of the gas pressure in the intake pipe Pind. For the cylinder i whose exhaust valve is opened, the shaft torque estimation unit 54 calculates the gas pressure in cylinder Pcyl_i, based on the gas pressure in the exhaust pipe Pex.

[Math. 6] (6)

1) For cylinder whose intake valve and exhaust valve are closed, $$\mathrm{Pcyl\_i}(\theta d) = \left(\frac{Vcyl0}{\mathrm{Vcyl\_\theta\_i}}\right)^{Nply} \times Pind$$

$$\mathrm{Vcyl\_\theta\_i} = Vcyl0 - Sp \times r\left\{(1 + \cos(\theta d\_i)) - \frac{r}{L}(1 + \cos(2 \times \theta d\_i))\right\}$$

2) For cylinder whose intake valve is opened and whose exhaust valve is closed, $$\mathrm{Pcyl\_i}(\theta d) = Pind$$

3) For cylinder whose exhaust valve is opened, $$\mathrm{Pcyl\_i}(\theta d) = Pex$$

Herein, Nply is a polytrophic index, and a preliminarily set value is used. Vcyl0 is a cylinder volume when the intake valve is closed. A preliminarily set value may be used for Vcyl0, or Vcyl0 may be changed according to the valve closing timing of the intake valve by the intake variable valve timing mechanism 14. Vcly_θ_i is a cylinder volume of each cylinder i at the crank angle θd_i of each cylinder i. Sp is a projection area of the top face of the piston. r is a crank length. L is a length of the connecting rod. For the crank angle θd_i of each cylinder i used for the calculation of the trigonometric function, a crank angle obtained by shifting the crank angle θd so that the top dead center of the compression stroke is 0 degree is used for each cylinder i. As the detection value of the gas pressure in the intake pipe Pind, a value after averaging processing, such as average value in the stroke period may be used, or the detection value at the time of closing the intake valve may be used. As the gas pressure in the exhaust pipe Pex, the detection value of the atmospheric pressure may be used, or a predetermined value may be used.

Then, the shaft torque estimation unit 54 calculates the gas pressure torque Tgas, using the next equation that converts gas pressure into torque, based on the gas pressure in cylinder Pcyl_i and the crank angle θd_i of each cylinder i.

[Math. 7] (7)

$$Tgas(\theta d) = \sum_{i=1}^{N}\{(\mathrm{Pcyl\_i} - Pcase) \times Sp \times \mathrm{R\_i}\}$$

$$\mathrm{R\_i} = r\left\{\sin(\theta d\_i) - \frac{1}{2}\frac{r}{L}\cos(2 \times \theta d\_i)\right\}$$

Herein, Pcase is an internal pressure (back pressure of the piston) in the crankcase. Pcase may be set to a predetermined value, or Pcase may be changed according to the detection value of the gas pressure in the intake pipe Pind, the atmospheric pressure, and the like. R_i is a conversion coefficient that converts a force generated on the piston of each cylinder i into a torque around the crankshaft. In the case of the offset crank, an offset may be considered in the calculation of the conversion coefficient R_i. N is a cylinder number, and N is set to 3 in the present embodiment.

At each crank angle θd, the shaft torque estimation unit 54 calculates an inertia torque Tin generated by the reciprocating movement of the piston, using the physical model equation that calculates the inertia torque generated by the reciprocating movement of the piston, based on the crank angle speed ωd.

The shaft torque estimation unit 54 calculates the inertia torque Tin generated by the reciprocating movement of the piston of each cylinder i, using the next equation which converts an acceleration of the piston and an inertial force of the piston into a torque, based on the crank angle speed ωd and the crank angle θd.

[Math. 8]

$$Tin(\theta d) = \sum_{i=1}^{N}(mp \times \alpha p\_i \times R\_i) \quad (8)$$
$$\alpha p\_i = \omega d^2 \times r\left\{\cos(\theta d\_i) + \frac{r}{L}\cos(2 \times \theta d\_i)\right\}$$

Herein, mp is a mass of the piston. αp_i is the acceleration of the piston of each cylinder i at the crank angle speed ωd. R_i is a conversion coefficient calculated by the second equation of the equation (7). An inertia torque generated by the inertia of the connecting rod and the like may be added to the inertia torque Tin.

Then, the shaft torque estimation unit 54 calculates the estimation value of the shaft torque Tcrke for each crank angle θd by summing the gas pressure torque Tgas and the inertia torque Tin which were calculated at each crank angle θd.

[Math. 9]

$$Tcrke(\theta d) = Tgas(\theta d) + Tin(\theta d) \quad (9)$$

Then, the shaft torque estimation unit 54 calculates the estimation value of the shaft torque Tcrke (n) for each angle section Sd (n), based on the estimation value of the shaft torque Tcrke for each crank angle θd. For example, the estimation value of the shaft torque Tcrke (n) corresponding to the center position of each angle section Sd (n) is calculated. As shown in the next equation, the shaft torque estimation unit 54 calculates an average value of the estimation value of the shaft torque Tcrke (θd (n−1)) at the start crank angle θd (n−1) of each angle section Sd (n), and the estimation value of the shaft torque Tcrke (θd (n)) at the end crank angle θd (n) of each angle section Sd (n), as the estimation value of the shaft torque Tcrke (n) of each angle section Sd (n). Alternatively, the crank angle θd used for the calculation of the estimation value of the shaft torque Tcrke is set as the crank angle θd corresponding to the center position of each angle section Sd, the estimation value of the shaft torque Tcrke corresponding to the center position of each angle section Sd may be calculated directly.

[Math. 10]

$$Tcrke(n) = \frac{Tcrke(\theta d(n-1)) + Tcrke(\theta d(n))}{2} \quad (10)$$

The influence of the external load torque Tload is not considered in the estimation value of the shaft torque Tcrke calculated above. So, in the present embodiment, the external load torque Tload is calculated as described below, and the estimation value of the shaft torque Tcrke is corrected by the external load torque Tload. The external load torque Tload is a torque applied to the crankshaft from the outside of the internal combustion engine. The external load torque Tload includes a running resistance and a frictional resistance of the vehicle which are transmitted to the internal combustion engine from the power transfer mechanism connected with the wheels, and an auxiliary machine load, such as the alternator connected with the crankshaft.

Even if the correction by the external load torque Tload is not performed, the influence by the external load torque Tload is also collectively corrected by correction by the average detection angular speed ωsaved described below. Accordingly, the correction by the external load torque Tload may not be performed.

The shaft torque estimation unit 54 calculates a detection value of the shaft torque Tcrkd of the crankshaft, based on the detection value of the crank angular acceleration αd, and the inertia moment Icrk of the crankshaft system. In the present embodiment, the shaft torque estimation unit 54 calculates the detection value of the shaft torque Tcrkd (n) corresponding to each angle section Sd (n) using the next equation. Herein, in the present embodiment, as shown in FIG. 7, the detection value of the crank angular acceleration αd (n) is the angular acceleration at the time point of the end crank angle θd (n) of each angle section Sd (n). So, in order to calculate the detection value of the crank angular acceleration corresponding to each angle section Sd (n), an average value of the crank angular acceleration αd (n) at the present crank angle θd (n) and the crank angular acceleration αd (n−1) at the previous crank angle θd (n−1) is used.

[Math. 11]

$$Tcrkd(n) = \frac{\alpha d(n-1) + \alpha d(n)}{2} \times Icrk \quad (11)$$

The shaft torque estimation unit 54 calculates the external load torque Tload based on the estimation value of the shaft torque Tcrke (θd_tdc) and the detection value of the shaft torque Tcrkd (θd_tdc) which were calculated at the crank angle θd_tdc in the vicinity of the top dead center of the piston. In the vicinity of the top dead center, the connecting rod and the crank are aligned, and the shaft torque Tcrk is not generated by the force of the cylinder pressure pushing the piston. Accordingly, in the vicinity of the top dead center, the external load torque Tload can be calculated with good accuracy by a deviation between the detection value of the shaft torque Tcrkd and the estimation value of the shaft torque Tcrke. Since the external load torque Tload usually does not fluctuate largely in the stroke period, the external load torque Tload calculated in the vicinity of the top dead center can be used at each crank angle θd. The crank angle θd_tdc in the vicinity of the top dead center is preliminarily set to a crank angle in the vicinity of the top dead center. Herein, the vicinity of the top dead center is within an angle interval from 10 degrees before the top dead center to 10 degrees after the top dead center, for example. For example, the crank angle θd in the vicinity of the top dead center is preliminarily set to the crank angle of the top dead center. In the present embodiment, the shaft torque estimation unit 54 calculates the external load torque Tload using the next equation.

[Math. 12]

$$Tload = Tcrkd(\theta d\_tdc) - Tcrke(\theta d\_tdc) \quad (12)$$

The shaft torque estimation unit 54 may calculate the external load torque Tload by a deviation between an average value of the detection values of the shaft torque Tcrkd and an average value of the estimation values of the shaft torque Tcrke after averaging processing.

The shaft torque estimation unit 54 corrects the estimation value of the shaft torque Tcrke (n) of each angle section Sd (n) by the external load torque Tload. In the present embodiment, as shown in the next equation, the shaft torque estimation unit 54 calculates a value obtained by adding the external load torque Tload to the estimation value of the shaft torque Tcrke (n) of each angle section Sd (n), as the estimation value of the shaft torque Tcrke (n) after correction.

[Math. 13]

$$Tcrke(n) \leftarrow Tcrke(n) + Tload \quad (13)$$

<One Rotation Time Detection Unit 57>

The one rotation time detection unit 57 detects one rotation time interval ΔT360 which is a time interval of one rotation angle interval S360 where the crankshaft rotates once, based on the output signal of the second crank angle sensor 6; and calculates an average detection angular speed ωsaved which is an average angular speed in an average processing angle section Save set within a range of the one rotation angle interval S360, based on the detection value ΔT360 of the one rotation time interval.

Figure 10:
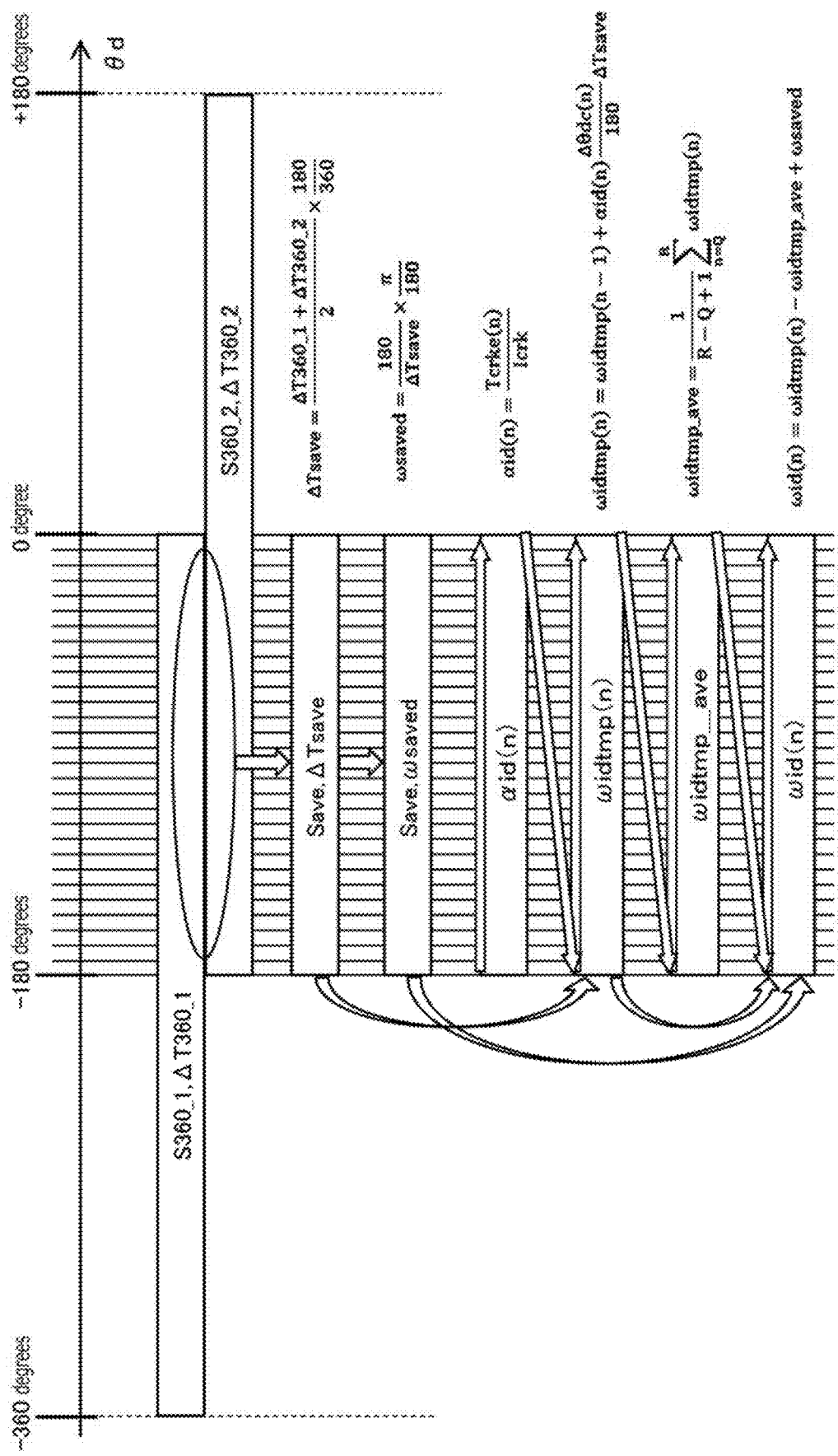
FIG. 10 is a figure for explaining the processing of the one rotation time detection unit and the ideal angular speed calculation unit according to Embodiment 1.

In the present embodiment, as shown in FIG. 10, for each of first one rotation angle interval S360_1 and second one rotation angle interval S360_2 in which angle intervals are shifted while overlapping with each other, the one rotation time detection unit 57 detects first one rotation time interval ΔT360_1 and second one rotation time interval ΔT360_2, and sets an angle section overlapping between the first one rotation angle interval S360_1 and the second one rotation angle interval S360_2, as the average processing angle section Save. Then, the one rotation time detection unit 57 calculates a time interval ΔTsave of the average processing angle section, based on an average value of the first one rotation time interval ΔT360_1 and the second one rotation time interval ΔT360_2, and calculates an average detection angular speed ωsaved based on the time interval ΔTsave of the average processing angle section.

In the present embodiment, the average processing angle section Save is set to 180 degrees. The first one rotation angle interval S360_1 is set to an angle section from an angle on the retard angle side by 180 degrees from the start angle of the average processing angle section Save, to the end angle of the average processing angle section Save. The second one rotation angle interval S360_2 is set to an angle section from the start angle of the average processing angle section Save to an angle on the advance angle side by 180 degrees from the end angle of the average processing angle section Save. The calculation processing of the average detection angular speed ωsaved is performed for every average processing angle section Save.

In the present embodiment, the one rotation time detection unit 57 calculates the average detection angular speed ωsaved using the next equation.

[Math. 14]

$$\Delta Tsave = \frac{\Delta T360\_1 + \Delta T360\_2}{2} \times \frac{180}{360} \quad (14)$$

$$\omega saved = \frac{180}{\Delta Tsave} \times \frac{\pi}{180}$$

The average processing angle section Save may be set to any angle interval within 360 degrees. For example, the average processing angle section Save may be set to 360 degrees. In this case, since the first one rotation angle interval S360_1 and the second one rotation angle interval S360_2 are the same, the average detection angular speed ωsaved may be calculated based on the one rotation time interval ΔT360 of the one rotation angle interval S360.

<Ideal Angular Speed Calculation Unit 55>

The ideal angular speed calculation unit 55 calculates an ideal interval angular speed ωid which is an angular speed corresponding to the each angle section Sd in an ideal state assuming that there is no variation in the plurality of crank angles where the plurality of teeth are arranged (hereinafter, referred to also as the arrangement crank angle of teeth), based on the estimation value of the shaft torque Tcrke (n) of the each angle section Sd (n), and the inertia moment Icrk of the crankshaft system.

Since the estimation value of the shaft torque Tcrke is calculated using the physical model equation of the crank mechanism, it is a shaft torque in the ideal state assuming that there is no variation in the arrangement crank angle of teeth. Then, since the ideal interval angular speed ωid is calculated based on the estimation value of the shaft torque Tcrke, it is an interval angular speed in the ideal state.

In the present embodiment, in order to change the correction value Kc (n) of the each angle section Sd (n) so that the average value ωsd_ave of the detection section angular speeds ωsd in the average processing angle section Save does not deviate from the average detection angular speed ωsaved, the ideal angular speed calculation unit 55 coincides the average value ωid_ave of the ideal interval angular speeds ωid in the average processing angle section Save with the average detection angular speed ωsaved.

As shown in FIG. 10, the ideal angular speed calculation unit 55 calculates an ideal interval angular acceleration αid (n) which is an angular acceleration in the ideal state corresponding to the each angle section Sd (n), based on the estimation value of the shaft torque Tcrke (n) of the each angle section Sd (n), and the inertia moment Icrk of the crankshaft system; and calculates a temporary ideal interval angular speed ωidtmp (n) which is an angular speed in the ideal state corresponding to the each angle section Sd (n) by integrating the ideal interval angular acceleration αid (n). In the present embodiment, the ideal angular speed calculation unit 55 calculates the temporary ideal interval angular speed ωidtmp using the next equation. This calculation processing is performed for the each angle section Sd in the average processing angle section Save (n).

[Math. 15]

-continued $$\alpha id(n) = \frac{Tcrke(n)}{Icrk} \quad (15)$$

$$\omega idtmp(n) = \omega idtmp(n-1) + \alpha id(n)\frac{\Delta\theta dc(n)}{180}\Delta Tsave$$

As shown in the next equation, the ideal angular speed calculation unit 55 calculates an average value ωidtmp_ave of the temporary ideal interval angular speeds ωidtmp in the average processing angle section Save. Herein, Q is the angle identification number corresponding to the first angle section in the average processing angle section Save. R is the angle identification number corresponding to the last angle section in the average processing angle section Save.

[Math. 16]

$$\omega idtmp\_ave = \frac{1}{R - Q + 1}\sum_{n=Q}^{R} \omega idtmp(n) \quad (16)$$

Then, as shown in the next equation, the ideal angular speed calculation unit 55 calculates a value obtained by subtracting the average value ωidtmp_ave of the temporary ideal interval angular speeds from the temporary ideal interval angular speed ωidtmp, and adding the average detection angular speed ωsaved, as the ideal interval angular speed ωid. This calculation processing is performed for the each angle section Sd in the average processing angle section Save (n).

[Math. 17]

$$\omega id(n) = \omega idtmp(n) - \omega idtmp\_ave + \omega saved \quad (17)$$

By this calculation processing, the average value ωid_ave of the ideal interval angular speeds ωid in the average processing angle section Save can be coincided with the average detection angular speed ωsaved. Accordingly, as described later, since the correction value Kc is changed so that the detection section angular speed ωsd approaches the ideal interval angular speed ωid, the correction value Kc can be changed so that the average value ωsd_ave of the detection section angular speeds ωsd in the average processing angle section Save does not deviate from the average detection angular speed ωsaved.

Figure 11:
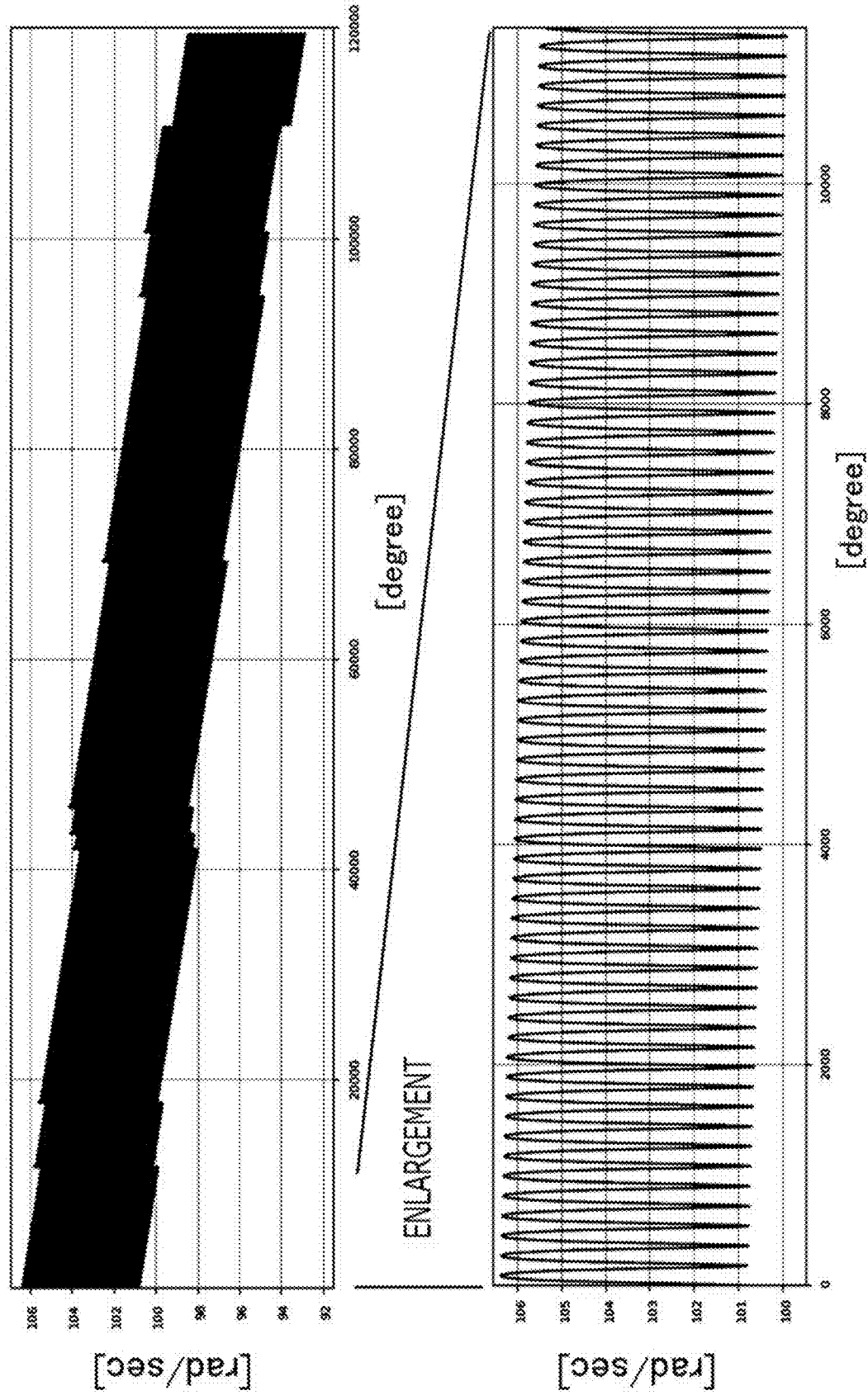
FIG. 11 is a figure for explaining the behavior of the crank angle speed when the correction processing is not performed according to Embodiment 1.
Figure 12:
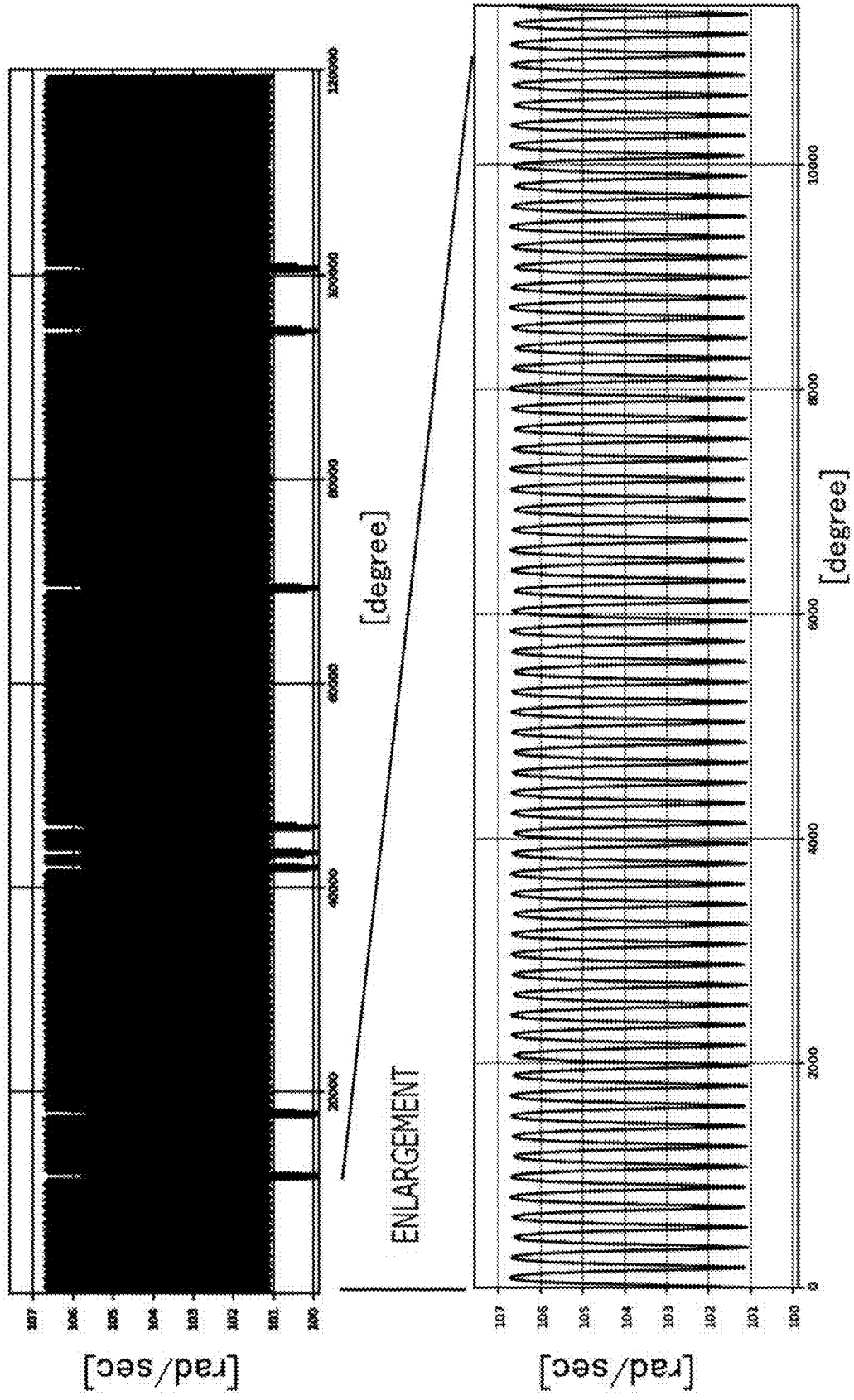
FIG. 12 is a figure for explaining the behavior of the crank angle speed when the correction processing is performed according to Embodiment 1.

FIG. 11 shows the control behavior in the case where the temporary ideal interval angular speed ωidtmp is set as the ideal interval angular speed ωid as it is, under the condition of the constant crank angle speed. In this case, since the average value ωid_ave of the ideal interval angular speeds ωid deviates from the average detection angular speed ωsaved, the average value ωsd_ave of the detection section angular speeds ωsd deviates from the average detection angular speed ωsaved, although the crank angle speed is constant, the detection section angular speed ωsd shifts gradually, and the error occurs. On the other hand, FIG. 12 shows the control behavior in the case of correcting like the equation (17). In this case, since the average value ωid_ave of the ideal interval angular speeds ωid coincides with the average detection angular speed ωsaved, the average value ωosd_ave of the detection section angular speeds ωosd can be prevented from deviating from the average detection angular speed ωsaved, the detection section angular speed ωsd does not shift, and the error does not occur.

<Correction Value Change Unit 56>

For the each angle section Sd (n), the correction value change unit 56 changes the correction value Kc (n) of the each angle section Sd (n) so that the detection section angular speed ωsd (n) which is an angular speed corresponding to the angle section calculated by the time interval ΔTdc and the angle interval Δθdc after the correction processing by the correction value Kc approaches the ideal interval angular speed ωid (n).

According to this configuration, since the ideal interval angular speed ωid is an interval angular speed in the ideal state, the high frequency component due to the variation of the arrangement crank angle of teeth is not superimposed. Accordingly, by changing the correction value Kc (n) of the each angle section Sd (n) so that the detection section angular speed ωsd (n) approaches the ideal interval angular speed ωid (n), the correction value Kc (n) can be appropriately changed so as to cancel the variation of the arrangement crank angle of teeth.

For the each angle section Sd (n), the correction value change unit 56 increases the correction value Kc (n) when the detection section angular speed ωsd (n) exceeds the ideal interval angular speed ωid (n), and decreases the correction value Kc (n) when the detection section angular speed ωsd (n) is below the ideal interval angular speed ωid (n).

Using the next equation, the correction value change unit 56 calculates the detection section angular speed ωsd (n) corresponding to the each angle section Sd (n), based on the time interval ΔTdc (n) and the angle interval Δθdc (n) after the correction processing by the correction value Kc.

[Math. 18]

$$\omega sd(n) = \frac{\Delta\theta dc(n)}{\Delta Tdc(n)} \times \frac{\pi}{180} \quad (18)$$

For example, the correction value change unit 56 updates the correction value Kc (n) using the next equation. Herein, Klrn is a learning rate and is set to a value less than or equal to one.

[Math. 19]

$$Kc(n) \leftarrow \left\{\frac{\omega sd(n)}{\omega id(n)} - 1\right\} \times Klrn + Kc(n) \quad (19)$$

In the present embodiment, the correction value change unit 56 collectively executes the change processing of the correction value Kc (n) of the each angle section Sd (n) in the average processing angle section Save, every time when the calculation processing of the ideal interval angular speed ωid (n) of the each angle section Sd in the average processing angle section Save (n) is ended.

In the present embodiment, the correction value change unit 56 changes the correction value Kc when the internal combustion engine is in the unburning state (when the first condition is satisfied). On the other hand, the correction value change unit 56 does not change the correction value Kc, when the internal combustion engine is in the burning state (when the first condition is not satisfied). The unburning state includes a fuel cut state in which the fuel supply is stopped.

In the unburning state, there is no increase in the cylinder internal pressure due to burning that is not assumed in the physical model equation of the crank mechanism, so the calculation accuracy of the ideal interval angular speed ωid is improved. Accordingly, the accuracy of the correction value Kc change can be improved.

The correction value change unit 56 changes the correction value Kc, when an absolute value of a change amount of the average value of the detection section angular speeds ωsd is less than or equal to a change amount determination value (when the second condition is satisfied). On the other hand, the correction value change unit 56 does not change the correction value Kc, when the absolute value of the change amount exceeds the change amount determination value (when the second condition is not satisfied). The average value of the detection section angular speeds ωsd is an average value in an average period, such as the average processing angle section Save or the stroke period, for example.

When the absolute value of the change amount of the average value of the detection section angular speeds ωsd is large, the influence of disturbance such as the external load torque Tload is large, and the accuracy of correction value Kc change may be deteriorated due to the influence of disturbance. Accordingly, by changing the correction value Kc in a stable state where the absolute value of the change amount of the average value of the detection section angular speeds ωsd is small, the accuracy of the correction value Kc change can be improved.

The correction value change unit 56 changes the correction value Kc, when an operation amount of the brake mechanism of the vehicle mounted with the internal combustion engine is less than or equal to an operation amount determination value (when the third condition is satisfied). On the other hand, the correction value change unit 56 does not change the correction value Kc, when the operation amount of the brake mechanism exceeds the operation amount determination value (when the third condition is not satisfied).

When the operation amount of the brake mechanism is large, the external load torque Tload is largely varied due to the braking force of the brake, the accuracy of the correction value Kc change may be deteriorated. Accordingly, by changing the correction value Kc in a stable state where the operation amount of the brake mechanism is small, the accuracy of the correction value Kc change can be improved.

The correction value change unit 56 changes the correction value Kc, when a clutch mechanism connected to the crankshaft is in a disengaged state (when the fourth condition is satisfied). On the other hand, the correction value change unit 56 does not change the correction value Kc, when the clutch mechanism is in a connected state (when the fourth condition is not satisfied). For example, the clutch mechanism is provided between the crankshaft and the transmission.

When the clutch mechanism is in the connected state, the accuracy of the correction value Kc change may be deteriorated by the external load torque Tload transmitted from the wheel side. Accordingly, by changing the correction value Kc when the clutch mechanism is in the disengaged state, the accuracy of the correction value Kc change can be improved.

The correction value change unit 56 changes the correction value Kc, when a cooling water temperature of the internal combustion engine is greater than or equal to a first water temperature determination value (when the fifth condition is satisfied). On the other hand, the correction value change unit 56 does not change the correction value Kc, when the cooling water temperature is less than the first water temperature determination value (when the fifth condition is not satisfied). Alternatively, the correction value change unit 56 changes the correction value Kc, when the cooling water temperature is greater than or equal to the first water temperature determination value and is less than or equal to a second water temperature determination value which is higher than the first water temperature determination value (when the fifth condition is satisfied). The correction value change unit 56 does not change the correction value Kc, when the cooling water temperature is less than the first water temperature determination value, or the cooling water temperature is larger than the second water temperature determination value (when the fifth condition is not satisfied). The first water temperature determination value and the second water temperature determination value are preliminarily set to values such that the correction value Kc is changed when the internal combustion engine is warmed up, and the cooling water temperature is the normal operating temperature.

When the cooling water temperature is the normal operating temperature, friction and other conditions of the internal combustion engine are stabilized, and the accuracy of the correction value Kc change can be improved.

In the present embodiment, the correction value change unit 56 changes the correction value Kc when all of the above first condition to the fifth condition are satisfied, and does not change the correction value Kc when any one of the first condition to the fifth condition is not satisfied. Alternatively, all of the first condition to the fifth condition may not be used, but at least the first condition may be used.

Figure 13:
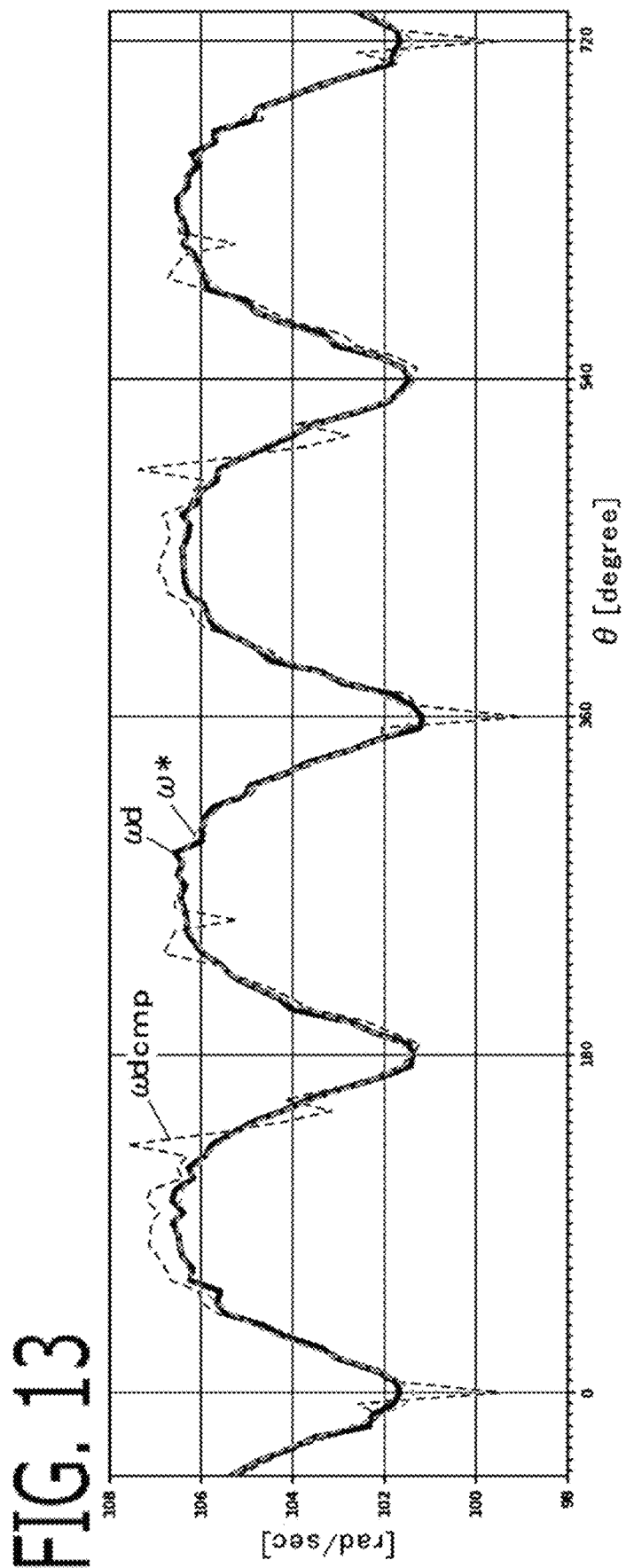
FIG. 13 is a figure for explaining the variation of the crank angle speed when the correction processing is performed according to Embodiment 1.

FIG. 13 shows the behavior of the crank angle speed ωdcmp without the correction processing calculated based on the angle interval Δθd and the time interval ΔTd which are not corrected by the correction value Kc, a high precision crank angle speed ω* detected by the high precision rotation sensor provided for measurement, and the crank angle speed ωd after the correction processing by the correction value Kc, when the variation of the arrangement crank angle of the teeth occurs. As shown in FIG. 13, the crank angle speed ωd after the correction processing approaches the high precision crank angle speed ω* for measurement from the crank angle speed ωdcmp without the correction processing. Accordingly, the correction value Kc can be appropriately changed so that the variation of the arrangement crank angle of teeth is canceled, and the detection error of the crank angle θd can be corrected with good accuracy.

2. Embodiment 2

The controller 50 according to Embodiment 2 will be explained with reference to drawings. The explanation for constituent parts the same as those in Embodiment 1 will be omitted. The basic configuration of the controller 50 according to the present embodiment is the same as that of Embodiment 1. Embodiment 2 is different from Embodiment 1 in the processing of the ideal angular speed calculation unit 55.

Similar to Embodiment 1, the ideal angular speed calculation unit 55 calculates an ideal interval angular speed ωid which is an angular speed corresponding to the each angle section Sd in an ideal state assuming that there is no variation in the arrangement crank angle of teeth, based on the estimation value of the shaft torque Tcrke (n) of the each angle section Sd (n), and the inertia moment Icrk of the crankshaft system.

In order to change the correction value Kc (n) of the each angle section Sd (n) so that the average value ωsd_ave of the detection section angular speed $\omega sd$ in the average processing angle section Save does not deviate from the average detection angular speed $\omega saved$, the ideal angular speed calculation unit 55 coincides the average value $\omega id\_ave$ of the ideal interval angular speed $\omega id$ in the average processing angle section Save with the average detection angular speed $\omega saved$.

Figure 14:
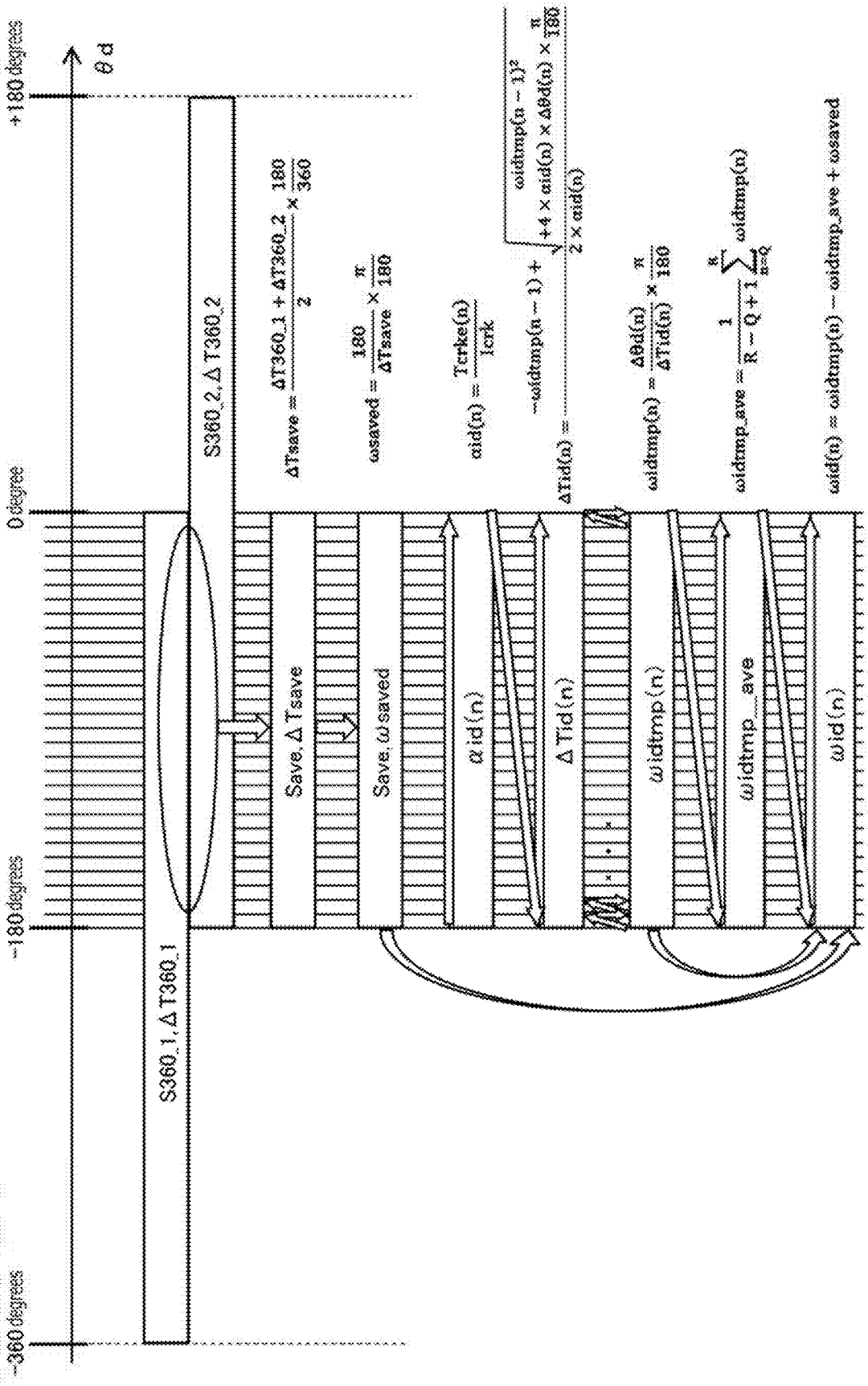
FIG. 14 is a figure for explaining the processing of the one rotation time detection unit and the ideal angular speed calculation unit according to Embodiment 2.

As shown in FIG. 14, the ideal angular speed calculation unit 55 calculates an ideal interval angular acceleration $\alpha id$ (n) which is an angular acceleration in the ideal state corresponding to the each angle section Sd (n), based on the estimation value of the shaft torque Tcrke (n) of the each angle section Sd (n), and the inertia moment Icrk of the crankshaft system. This calculation processing is performed for the each angle section Sd in the average processing angle section Save (n).

[Math. 20]

$$\alpha id(n) = \frac{Tcrke(n)}{Icrk} \quad (20)$$

Unlike Embodiment 1, the ideal angular speed calculation unit 55 sets the angle section for arithmetic object Scal (n) by changing the angle section Sd one by one to the advance angle side; calculates the ideal time interval $\Delta Tid$ (n) which is a time interval in the ideal state corresponding to the angle section for arithmetic object Scal (n), based on the ideal interval angular acceleration $\alpha id$ (n) corresponding to the angle section for arithmetic object Scal (n), and the temporary ideal interval angular speed $\omega idtmp$ (n−1) calculated in the angle section for arithmetic object Scal (n−1) on one retard angle side; and calculates the temporary ideal interval angular speed $\omega idtmp$ (n) which is an angular speed in the ideal state corresponding to the angle section for arithmetic object Scal (n), based on the ideal time interval $\Delta Tid$ (n) corresponding to the angle section for arithmetic object Scal (n).

In the present embodiment, the each angle section Sd in the average processing angle section Save (n) is changed to the advance angle side one by one from the first angle section Sd (Q) to the last angle section Sd (R) of the average processing angle section Save, and is set as the angle section for arithmetic object Scal (n) (n=Q, Q+1, . . . , R−1, R). Herein, Q is the angle identification number corresponding to the first angle section in the average processing angle section Save. R is the angle identification number corresponding to the last angle section in the average processing angle section Save.

Using the next equation, the ideal angular speed calculation unit 55 calculates the ideal time interval $\Delta Tid$ (n) which is a time interval in the ideal state corresponding to the angle section for arithmetic object Scal (n), based on the ideal interval angular acceleration $\alpha id$ (n) corresponding to the angle section for arithmetic object Scal (n), and the temporary ideal interval angular speed $\omega idtmp$ (n−1) calculated in the angle section for arithmetic object Scal (n−1) on one retard angle side.

[Math. 21]

$$\Delta Tid(n) = \frac{-\omega idtmp(n-1) + \sqrt{\omega idtmp(n-1)^2 + 4 \times \alpha id(n) \times \Delta \theta d(n) \times \frac{\pi}{180}}}{2 \times \alpha id(n)} \quad (21)$$

Using the next equation, the ideal angular speed calculation unit 55 calculates the temporary ideal interval angular speed $\omega idtmp$ (n) which is an angular speed in the ideal state corresponding to the angle section for arithmetic object Scal (n), based on the ideal time interval $\Delta Tid$ (n) corresponding to the angle section for arithmetic object Scal (n).

[Math. 22]

$$\omega idtmp(n) = \frac{\Delta \theta d(n)}{\Delta Tid(n)} \times \frac{\pi}{180} \quad (22)$$

While increasing the angle identification number n one by one from Q to R, calculations of the equation (21) and the equation (22) are performed at each angle identification number n.

Then, as shown in the next equation, the ideal angular speed calculation unit 55 calculates an average value $\omega idtmp\_ave$ of the temporary ideal interval angular speeds $\omega idtmp$ in the average processing angle section Save.

[Math. 23]

$$\omega idtmp\_ave = \frac{1}{R-Q+1} \sum_{n=Q}^{R} \omega idtmp(n) \quad (23)$$

As shown in the next equation, the ideal angular speed calculation unit 55 calculates a value obtained by subtracting the average value $\omega idtmp\_ave$ of the temporary ideal interval angular speeds from the temporary ideal interval angular speed $\omega idtmp$, and adding the average detection angular speed $\omega saved$, as the ideal interval angular speed $\omega id$. This calculation processing is performed for the each angle section Sd in the average processing angle section Save (n).

[Math. 24]

$$\omega id(n) = \omega idtmp(n) - \omega idtmp\_ave + \omega saved \quad (24)$$

By this calculation processing, similar to Embodiment 1, the average value $\omega id\_ave$ of the ideal interval angular speeds $\omega id$ in the average processing angle section Save can be coincided with the average detection angular speed $\omega saved$. Accordingly, since the correction value Kc is changed so that the detection section angular speed $\omega sd$ approaches the ideal interval angular speed $\omega id$, the correction value Kc can be changed so that the average value $\omega sd\_ave$ of the detection section angular speeds $\omega sd$ in the average processing angle section Save does not deviate from the average detection angular speed $\omega saved$.

3. Embodiment 3

The controller 50 according to Embodiment 3 will be explained with reference to drawings. The explanation for constituent parts the same as that of Embodiment 1 or 2 will be omitted. The basic configuration of the controller 50 according to the present embodiment is the same as that of Embodiment 1 or 2. Embodiment 3 is different from Embodiment 1 or 2 in the processing of the correction value change unit 56.

In the present embodiment, in order to change the correction value Kc (n) of the each angle section Sd (n) so that the average value ωsd_ave of the detection section angular speeds ωsd in the average processing angle section Save does not deviate from the average detection angular speed ωsaved, the correction value change unit 56 coincides an average value ωsd_ave of the detection section angular speeds ωsd in the average processing angle section Save with the average detection angular speed ωsaved.

Figure 15:
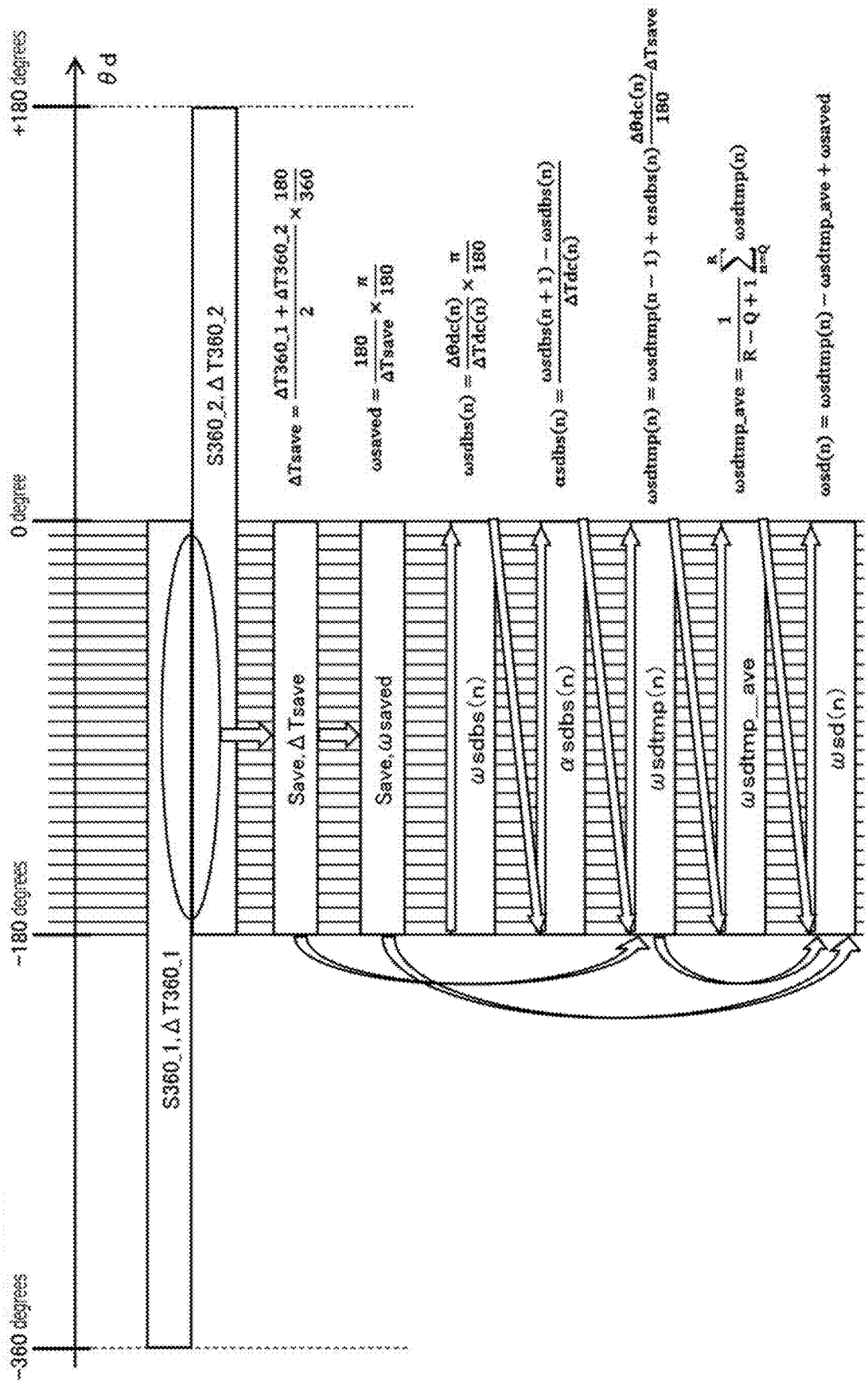
FIG. 15 is a figure for explaining processing of the one rotation time detection unit and the correction value change unit according to Embodiment 3.

As shown in FIG. 15, the correction value change unit 56 calculates a base detection section angular speed ωsdbs (n) which is an angular speed corresponding to the each angle section Sd (n), based on the time interval ΔTdc (n) and the angle interval Δθdc (n) after the correction processing by the correction value. The next equation is used for this calculation processing. This calculation processing is performed for the each angle section Sd in the average processing angle section Save (n).

[Math. 25]

$$\omega sdbs(n) = \frac{\Delta \theta dc(n)}{\Delta Tdc(n)} \times \frac{\pi}{180} \quad (25)$$

The correction value change unit 56 calculates a base detection section angular acceleration αsdbs (n) which is an angular acceleration corresponding to the each angle section Sd (n), based on the base detection section angular speed ωsdbs (n) and the time interval ΔTdc (n) corresponding to the each angle section Sd (n); and calculates a temporary detection section angular speed ωsdtmp (n) which is an angular speed corresponding to the each angle section Sd (n) by integrating the base detection section angular acceleration αsdbs (n). The next equation is used for this calculation processing. This calculation processing is performed for the each angle section Sd in the average processing angle section Save (n).

[Math. 26]

$$\alpha sdbs(n) = \frac{\omega sdbs(n+1) - \omega sdbs(n)}{\Delta Tdc(n)} \quad (26)$$

$$\omega sdtmp(n) = \omega sdtmp(n-1) + \alpha sdbs(n) \frac{\Delta \theta dc(n)}{180} \Delta Tsave$$

The correction value change unit 56 calculates an average value ωsdtmp_ave of the temporary detection section angular speeds ωsdtmp in the average processing angle section Save.

[Math. 27]

$$\omega sdtmp\_ave = \frac{1}{R - Q + 1} \sum_{n=Q}^{R} \omega sdtmp(n) \quad (27)$$

Then, as shown in the next equation, the correction value change unit 56 calculates a value obtained by subtracting the average value ωsdtmp_ave of the temporary detection section angular speeds from the temporary detection section angular speed ωsdtmp (n), and adding the average detection angular speed ωsaved, as the detection section angular speed ωsd (n). This calculation processing is performed for the each angle section Sd in the average processing angle section Save (n).

[Math. 28]

$$\omega sd(n) = \omega sdtmp(n) - \omega sdtmp\_ave + \omega saved \quad (28)$$

By this calculation processing, the average value ωsd_ave of the detection section angular speeds in the average processing angle section Save can be coincided with the average detection angular speed ωsaved. Accordingly, the correction value Kc can be changed so that the average value ωsd_ave of the detection section angular speeds ωsd in the average processing angle section Save does not deviate from the average detection angular speed ωsaved.

Then, similar to Embodiment 1, for the each angle section Sd (n), the correction value change unit 56 changes the correction value Kc (n) of the each angle section Sd (n) so that the detection section angular speed ωsd (n) approaches the ideal interval angular speed ωid (n).

Other Embodiments (1) In the above-mentioned Embodiment 1, there has been explained the case where the second crank angle sensor 6 corresponds to "the specific crank angle sensor" in the present disclosure, the flywheel 27 corresponds to "the rotation member" in the present disclosure, the tooth of ring gear 25 provided in flywheel 27 corresponds to the "the detected part" in this present disclosure. However, embodiments of the present disclosure are not limited to the foregoing case. That is to say, the first crank angle sensor 11 may correspond to "the specific crank angle sensor" in the present disclosure, the signal plate 10 may correspond to "the rotation member" in the present disclosure, a plurality of teeth provided in the signal plate 10 may correspond to the "the detected part" in the present disclosure.

(2) In the above Embodiment 1, there was explained the case where the internal combustion engine 1 is the gasoline engine. However, embodiments of the present disclosure are not limited to the foregoing case. That is to say, the internal combustion engine 1 may be various kinds of internal combustion engines, such as a diesel engine and an engine which performs HCCI combustion (Homogeneous-Charge Compression Ignition Combustion).

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: Internal Combustion Engine, 2: Crankshaft, 6: Second Crank Angle Sensor (Specific Crank Angle Sensor), 8: Gas Pressure Sensor, 50: Controller for Internal Combustion Engine, 51: Intake Pipe Gas Pressure Detection Unit, 52:

Angle Information Detection Unit, 53: Angle Information Correction Unit, 54: Shaft Torque Estimation Unit, 55: Ideal Angular Speed Calculation Unit, 56: Correction Value Change Unit, 57: One Rotation Time Detection Unit, Icrk: Inertia moment, Kc: Correction value, Pind: Detection value of the gas pressure in the intake pipe, S360: One rotation angle interval, S360_1: First one rotation angle interval, S360_2: Second one rotation angle interval, Save: Average processing angle section, Scal: Angle section for arithmetic object, Sd: Angle section, Tcrkd: Detection value of the shaft torque, Tcrke: Estimation value of the shaft torque, Td: Detection time, Tload: External load torque, $\Delta T360$: One rotation time interval, $\Delta\theta d$: Angle interval, $\Delta\theta dc$: Angle interval after the correction processing, $\Delta T360\_1$: First one rotation time interval, $\Delta T360\_2$: Second one rotation time interval, $\Delta Td$: Time interval, $\Delta Tdc$: Time interval after the correction processing, $\Delta Tid$: Ideal time interval, $\Delta Tsave$: Time interval of the average processing angle section, $\alpha d$: Detection value of the crank angular acceleration, $\alpha id$: Ideal interval angular acceleration, $\alpha sdbs$: Base detection section angular acceleration, $\theta d$: Crank angle (detected angle), $\omega d$: Crank angle speed, $\omega id$: Ideal interval angular speed, $\omega idtmp$: Temporary ideal interval angular speed, $\omega idtmp\_ave$: Average value of the temporary ideal interval angular speeds, $\omega saved$: Average detection angular speed, $\omega osd$: Detection section angular speed, $\omega osd\_ave$: Average value of the detection section angular speeds, $\omega sdbs$: Base detection section angular speed, $\omega sdtmp$: Temporary detection section angular speed, $\omega sdtmp\_ave$: Average value of the temporary detection section angular speeds

What is claimed is:

1. A controller for an internal combustion engine which controls an internal combustion engine which is provided with a plurality of detected parts provided at a plurality of preliminarily set crank angles on a rotation member integrally rotating with a crankshaft, a specific crank angle sensor fixed to a nonrotation member and detecting the detected part, and a gas pressure sensor detecting a gas pressure in an intake pipe, the controller for the internal combustion engine comprising at least one processor configured to implement:

an angle information detector that detects a crank angle and detects a detection time when the crank angle is detected, based on an output signal of the specific crank angle sensor, calculates an angle interval corresponding to an angle section between detected angles, based on the detected angle which is the detected crank angle, and calculates a time interval corresponding to the angle section, based on the detection time;

an angle information corrector that corrects the angle interval or the time interval of the each angle section by a correction value provided one corresponding to the each angle section;

an intake pipe gas pressure detector detects the gas pressure in the intake pipe, based on the output signal of the gas pressure sensor;

a shaft torque estimator that estimates a shaft torque of a crankshaft generated by a gas pressure in a cylinder and a reciprocating movement of a piston, using a physical model equation of a crank mechanism, based on a detection value of the gas pressure in the intake pipe and the detected angle, for the each angle section;

an ideal angular speed calculator that calculates an ideal interval angular speed which is an angular speed corresponding to the each angle section in an ideal state assuming that there is no variation in the plurality of crank angles where the plurality of detected parts are arranged, based on an estimation value of the shaft torque for the each angle section, and the inertia moment of a crankshaft system; and a correction value changer that changes the correction value for the each angle section so that a detection section angular speed which is an angular speed corresponding to the angle section calculated by the time interval and the angle interval after a correction processing by the correction value approaches the ideal interval angular speed, for the each angle section, wherein the angle information detector calculates a crank angle speed which is a time change rate of the crank angle, and a crank angular acceleration which is a time change rate of the crank angle speed, corresponding to each of the detected angle or the angle section, based on the angle interval and the time interval after the correction processing by the correction value, and wherein the controller for the internal combustion engine controls the internal combustion engine using the crank angle speed and the crank angular acceleration.

2. The controller for the internal combustion engine according to claim 1, further comprising a one rotation time detector that detects one rotation time interval which is a time interval of one rotation angle interval where the crankshaft rotates once, based on the output signal of the specific crank angle sensor, and calculates an average detection angular speed which is an average angular speed in an average processing angle section set within a range of the one rotation angle interval, based on a detection value of the one rotation time interval, wherein the correction value changer and the ideal angular speed calculator change the correction value for the each angle section so that an average value of the detection section angular speeds in the average processing angle section does not deviate from the average detection angular speed.

3. The controller for the internal combustion engine according to claim 2, wherein, for each of first one rotation angle interval and second one rotation angle interval in which angle intervals are shifted while overlapping with each other, the one rotation time detector detects first one rotation time interval and second one rotation time interval;

sets an angle section overlapping between the first one rotation angle interval and the second one rotation angle interval, as the average processing angle section;

calculates a time interval of the average processing angle section, based on an average value of the first one rotation time interval and the second one rotation time interval; and calculates the average detection angular speed, based on a time interval of the average processing angle section.

4. The controller for the internal combustion engine according to claim 2, wherein the ideal angular speed calculator calculates an ideal interval angular acceleration which is an angular acceleration in the ideal state corresponding to the each angle section, based on the estimation value of the shaft torque for the each angle section, and the inertia moment of the crankshaft system;

calculates a temporary ideal interval angular speed which is an angular speed in the ideal state corresponding to the each angle section by integrating the ideal interval angular acceleration;

calculates an average value of the temporary ideal interval angular speeds in the average processing angle section; and calculates a value obtained by subtracting the average value of the temporary ideal interval angular speeds from the temporary ideal interval angular speed and adding the average detection angular speed, as the ideal interval angular speed.

5. The controller for the internal combustion engine according to claim 2, wherein the ideal angular speed calculator calculates an ideal interval angular acceleration which is an angular acceleration in the ideal state corresponding to the each angle section, based on the estimation value of the shaft torque for the each angle section, and the inertia moment of the crankshaft system;

sets an angle section for arithmetic object by changing the angle section one by one to the advance angle side;

calculates the ideal time interval which is a time interval in the ideal state corresponding to the angle section for arithmetic object, based on the ideal interval angular acceleration corresponding to the angle section for arithmetic object, and the temporary ideal interval angular speed calculated in the angle section for arithmetic object on one retard angle side;

calculates the temporary ideal interval angular speed which is an angular speed in the ideal state corresponding to the angle section for arithmetic object, based on the ideal time interval corresponding to the angle section for arithmetic object;

calculates the average value of the temporary ideal interval angular speeds in the average processing angle section; and calculates a value obtained by subtracting the average value of the temporary ideal interval angular speeds from the temporary ideal interval angular speed, and adding the average detection angular speed, as the ideal interval angular speed.

6. The controller for the internal combustion engine according to claim 2, wherein the correction value changer calculates a base detection section angular speed which is an angular speed corresponding to the each angle section, based on the time interval and the angle interval after the correction processing by the correction value;

calculates a base detection section angular acceleration which is the angular acceleration corresponding to the each angle section, based on the base detection section angular speed and the time interval corresponding to the each angle section;

calculates a temporary detection section angular speed which is an angular speed corresponding to the each angle section by integrating the base detection section angular acceleration;

calculates an average value of the temporary detection section angular speeds in the average processing angle section; and calculates a value obtained by subtracting the average value of the detection section angular speeds from the temporary detection section angular speed, and adding the average detection angular speed, as the detection section angular speed.

7. The controller for the internal combustion engine according to claim 1, wherein the angle information detector a detection value of a crank angular acceleration, based on the time interval and the angle interval after the correction processing by the correction value, wherein the shaft torque estimator calculates a detection value of the shaft torque of the crankshaft, based on the detection value of the crank angular acceleration, and the inertia moment of the crankshaft system;

calculates an external load torque which is a torque applied to the crankshaft from an outside of the internal combustion engine, based on the estimation value of the shaft torque and the detection value of the shaft torque which were calculated at a crank angle in a vicinity of a top dead center of the piston; and corrects the estimation value of the shaft torque by the external load torque.

8. The controller for the internal combustion engine according to claim 1, wherein the correction value changer changes the correction value, when the internal combustion engine is in an unburning state.

9. The controller for the internal combustion engine according to claim 1, wherein the correction value changer changes the correction value, when an absolute value of a change amount of the average value of the detection section angular speeds is less than or equal to a change amount determination value.

10. The controller for the internal combustion engine according to claim 1, wherein the correction value changer changes the correction value, when an operation amount of a brake mechanism of a vehicle mounted with the internal combustion engine is less than or equal to an operation amount determination value.

11. The controller for the internal combustion engine according to claim 1, wherein the correction value changer changes the correction value, when a clutch mechanism connected to the crankshaft is in a disengaged state.

12. The controller for the internal combustion engine according to claim 1, wherein the correction value changer changes the correction value, when a cooling water temperature of the internal combustion engine is greater than or equal to a first water temperature determination value, or when the cooling water temperature is greater than or equal to the first water temperature determination value and is less than or equal to a second water temperature determination value which is greater than the first water temperature determination value.

\* \* \* \* \*